US 6,572,250 B1

(12) United States Patent
Assinder et al.

(10) Patent No.: US 6,572,250 B1
(45) Date of Patent: Jun. 3, 2003

(54) EXTERIOR MIRROR HAVING AN ATTACHMENT MEMBER INCLUDING AN APPROACH LIGHT

(75) Inventors: Andrew J. Assinder, Bognor Regis (GB); Neil J. Francis, Malvern (AU)

(73) Assignees: Britax Wingard Limited, Warwick (GB); Britax Rainsford Pty Limited, Lonsdale (AU)

(*) Notice: Subject to any disclaimer, the term of this patent is extended or adjusted under 35 U.S.C. 154(b) by 0 days.

(21) Appl. No.: 09/525,550

(22) Filed: Mar. 14, 2000

Related U.S. Application Data
(60) Provisional application No. 60/124,461, filed on Mar. 15, 1999.

(51) Int. Cl.[7] .................................................. B60Q 1/26
(52) U.S. Cl. ........................ 362/494; 362/142; 362/501
(58) Field of Search ................................. 362/494, 135, 362/142, 501; 359/871; 340/468

(56) References Cited

U.S. PATENT DOCUMENTS

| | | | |
|---|---|---|---|
| 5,017,903 A | * | 5/1991 | Krippelz, Sr. ............... 340/472 |
| 5,371,659 A | | 12/1994 | Pastrick et al. |
| 5,497,306 A | | 3/1996 | Pastrick |
| 5,499,169 A | * | 3/1996 | Chen ........................ 362/494 |
| 5,669,699 A | | 9/1997 | Pastrick et al. |
| 5,823,654 A | | 10/1998 | Pastrick et al. |
| 6,074,077 A | * | 6/2000 | Pastrick et al. ............. 362/494 |
| 6,079,858 A | * | 6/2000 | Hicks ......................... 362/486 |
| 6,176,602 B1 | * | 1/2001 | Pastrick et al. ............. 362/494 |
| 6,206,553 B1 | * | 3/2001 | Boddy et al. ............... 362/494 |
| 6,227,689 B1 | * | 5/2001 | Miller ........................ 362/494 |
| 6,257,746 B1 | * | 7/2001 | Todd et al. ................. 362/494 |
| 6,280,069 B1 | * | 8/2001 | Pastrick et al. ............. 362/494 |

FOREIGN PATENT DOCUMENTS

| | | |
|---|---|---|
| DE | 3635471 A1 | 10/1986 |
| JP | 102739 | 6/1987 |
| JP | 52250/91 | 5/1991 |

* cited by examiner

Primary Examiner—Sandra O'Shea
Assistant Examiner—Anabel Ton
(74) Attorney, Agent, or Firm—Warn, Burgess & Hoffman, P.C.

(57) ABSTRACT

An exterior mirror assembly including an attachment member for supporting an approach light. The attachment member interconnects a mirror housing to a vehicle and includes an opening for receiving a lens. Light projects through the lens from the attachment member in order to illuminate a predetermined area in proximity to the vehicle. A light source may be housed within the support member or, alternatively, a light source may be housed interior to the vehicle and a light path transports light from the light source to the lens for projection from the support member.

42 Claims, 16 Drawing Sheets

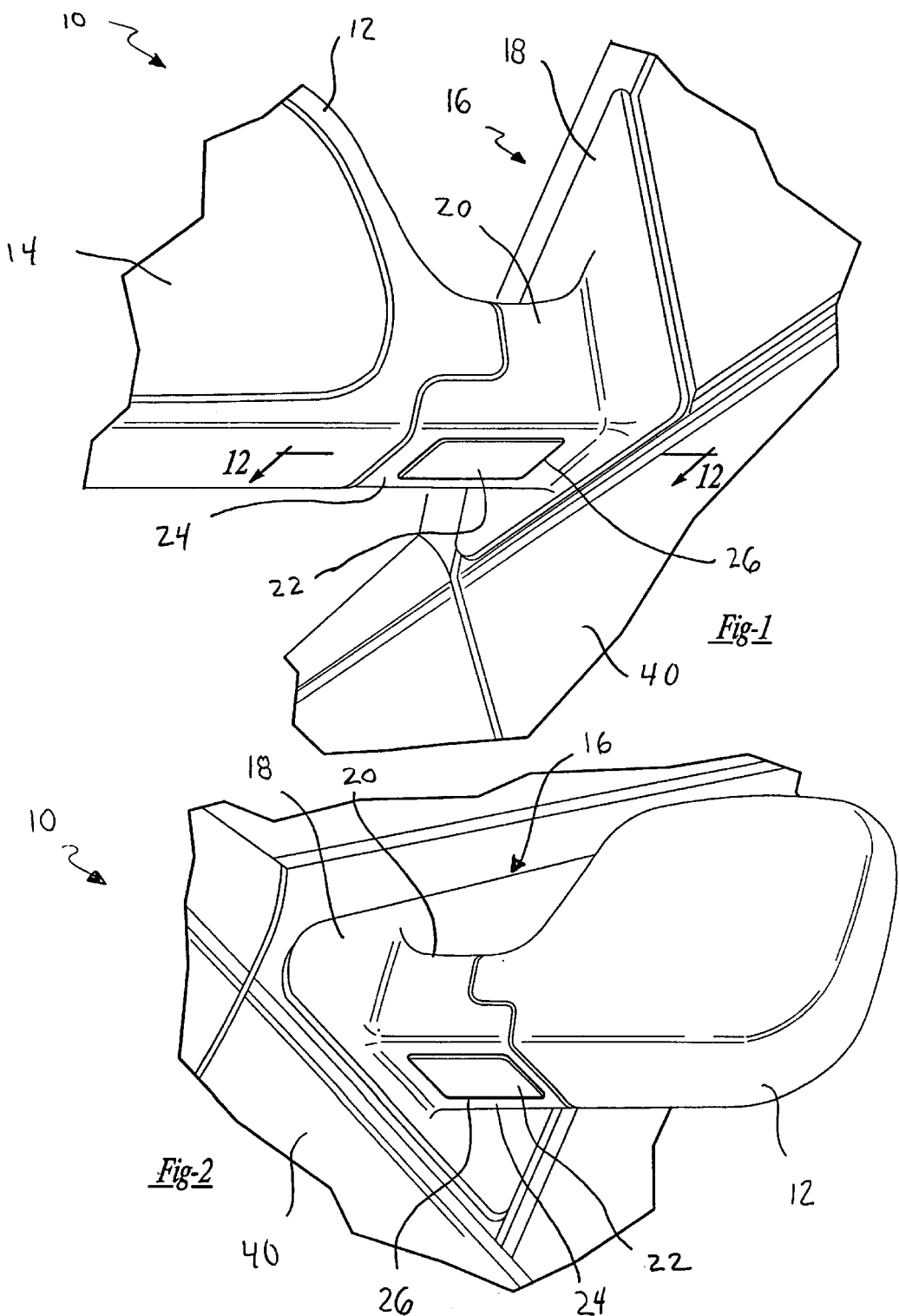

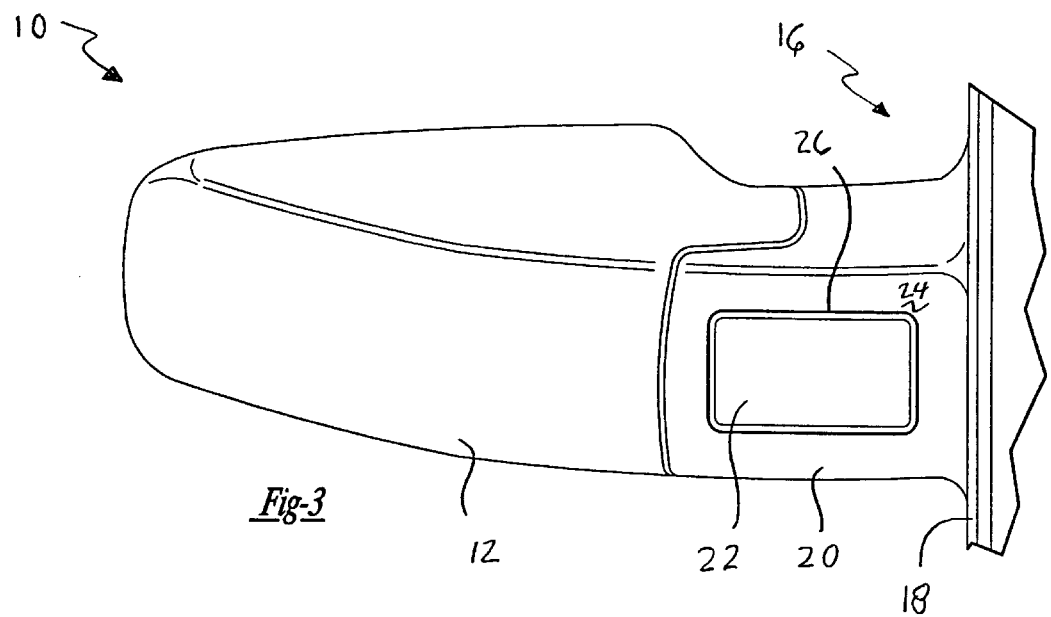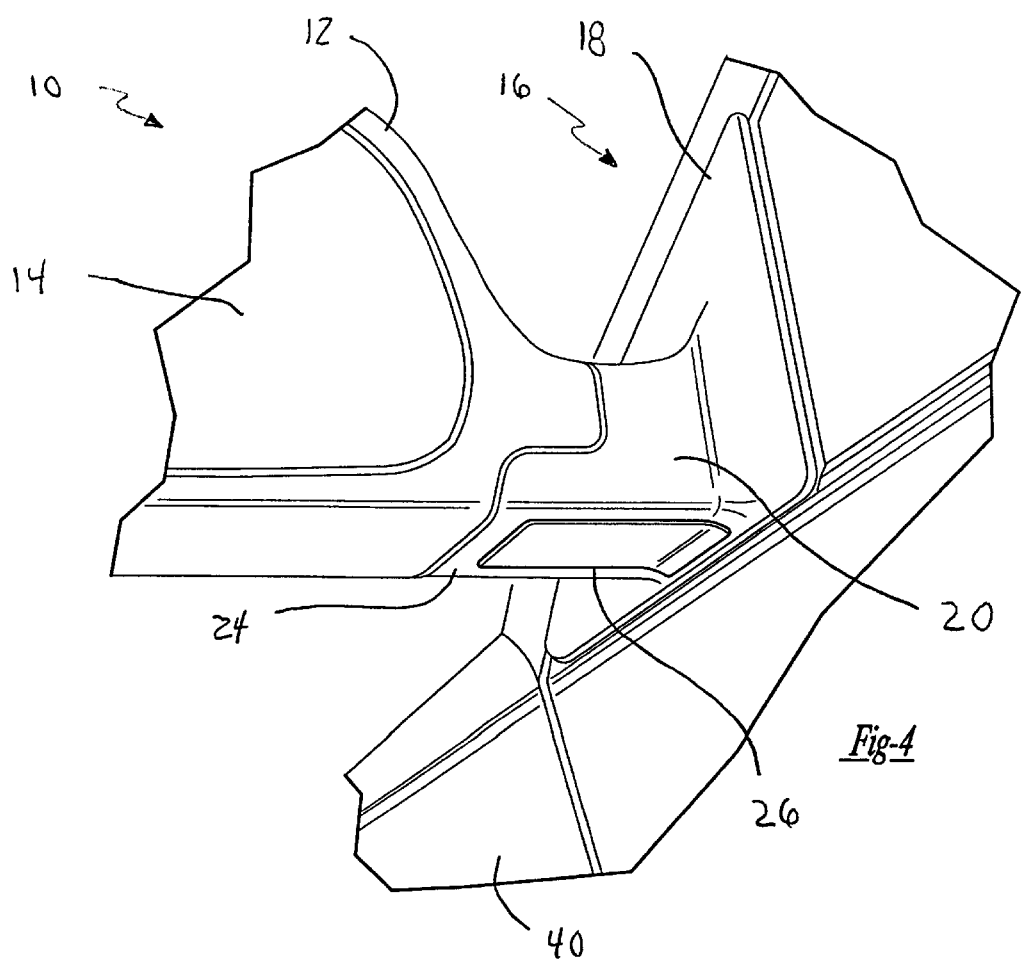

EXTERIOR MIRROR HAVING AN ATTACHMENT MEMBER INCLUDING AN APPROACH LIGHT

CROSS REFERENCE TO RELATED APPLICATIONS

This application claims the benefit of priority of U.S. Provisional Application Ser. No. 60/124,461, filed on Mar. 15, 1999, the entire contents of which are hereby expressly incorporated into the present application.

BACKGROUND OF THE INVENTION

1. Technical Description

The present invention relates to a mirror assembly in general and, more particularly, to an exterior mirror assembly for a vehicle including an approach light which illuminates an area in proximity to the vehicle.

2. Description of Related Art

Vehicle operators have become increasingly concerned about personal security in and around their vehicles. This concern heightens when a vehicle operator approaches a vehicle after it has been left unattended and the operator has been away from the vehicle. Approaching the vehicle often causes anxiety in the operator, as the operator realizes that an unattended vehicle provides a convenient hiding spot for potential perpetrators of assaults, robberies, and other personal violations. An unlit, unattended vehicle provides sufficient cover so that a would-be perpetrator could surprise the vehicle operator and other passengers as they approach the vehicle. For example, would-be perpetrators may hide along side, under, behind, or around the operator's vehicle. In parking lots, would-be perpetrators may seek additional cover not only from the operator's vehicle, but also from vehicles adjacent to the operator's vehicle. Thus, an increasing need exists to provide additional safety in proximity to vehicles and minimize cover provided to would-be perpetrators by vehicles, particularly at night.

It is well known that security lighting systems minimize the cover provided by darkness to would-be perpetrators. Many assaults, robberies, and other personal violations committed against vehicle operators approaching their car typically occur at night. It is also well known that providing suitable light eliminates many such incidents. Because it is not possible to sufficiently light every parking space of every parking lot, vehicle designers have endeavored to rely upon the vehicle to provide sufficient light to ward off would-be perpetrators. Many vehicles include keyless entry systems, which may or may not include additional alarm or security systems, which enable the vehicle operator to illuminate the interior of the vehicle when approaching the vehicle. However, illuminating the interior of the vehicle does not typically sufficiently illuminate the exterior of the vehicle, thereby enabling the operator to see would-be perpetrators.

Some systems have attempted to increase the lighting exterior to the vehicle in order to increase the safety margins provided to the operator and ward off would-be perpetrators. For example, vehicle designers have placed lights in mirror housings in order to illuminate the exterior of the vehicle. Examples of such systems may be found with reference to U.S. Pat. Nos. 5,371,659; 5,497,305; 4,497,306; 5,669,699; 5,669,704; 5,669,705; 5,823,654; and 5,863,116, the disclosures of which are herein incorporated by reference for their technical discussion. These patents discuss various systems for placing a light in the housing of a mirror assembly.

The above-referenced patents, however, primarily discuss placing a light in the housing of the mirror assembly. Typical mirror assemblies include a sail which attaches to a forward portion of the front driver or passenger side doors. The sail rigidly attaches to a hinge or bracket. The hinge or bracket in turn attaches to a housing which provides support and protection for a reflective element, such as mirror glass. The housing typically pivots with respect to the bracket so that the mirror housing may fold inward to increase safety and selectively reduce the overall width of the vehicle.

While the designs presented in the above-referenced U.S. patents enable illumination of the vehicle exterior, these designs increase vehicle cost and reduce performance of the mirror assembly. In particular, locating the light module in the mirror housing necessarily places more mass of the mirror assembly outboard from the car. This increased outboard mass increases the moment exerted by the mirror housing. The increased moment correspondingly increases the vibration of the mirror, decreasing the performance due to the vibration. Further, placing a light outboard in the mirror housing requires that wires be routed through the hinge to power the light placed in the mirror housing. Routing wires through the hinge that connects the bracket to the housing presents many design challenges and further complicates the mirror assembly design. Such wiring again moves weight further outboard and also requires an additional length of wire to power the light module in the mirror housing, thereby increasing the cost of the system. Because the mirror housing pivots with respect to the supporting sail and bracket, folding the mirror inward varies the angle of illumination provided by the light module because the angle of the mirror housing often varies with respect to the horizontal as the mirror folds inward. Because the mirror housing experiences significant aerodynamic effects, the windstream passing by the mirror housing provides ample opportunity to coat the lens area of a light mounted in the mirror housing with road debris, salt, mud, dust, dirt and the like.

Placing a light module in the mirror housing significantly limits the ability to seal the light module and electrical wiring from the elements, including water, road salt, dirt, debris, and the like. Most mirror housings also include an area between the mirror and the mirror housing which is not sealed. This area allows water, road salt, dust, dirt, and other debris to enter the interior of the mirror housing and potentially damage the light housing and accompanying wiring. The exposed light module placed in the housing must be sealed from the exterior contaminants. Sealing the light module resultantly causes the light module temperature to increase. The temperature may be reduced by limiting the output of the light source. This reduced output typically reduces the illumination output by the light source. Finally, placing a light module in the housing requires allocation of valuable space that limits the structural supports or other components that may be placed in the housing.

Thus, there is a need to provide an exterior mirror assembly which illuminates the exterior of the vehicle and improves upon the above-discussed configuration in which a light is provided within and illuminates from the mirror housing.

This invention is also directed to an exterior rear view mirror assembly including housing and a reflective mirror supported by the housing and arranged in a rearwardly facing direction. A support member has an outboard end attached to the housing and an inboard end secured to an outer surface of a motor vehicle. The support member includes an opening. A sail attaches to the inboard end of the support member and secures the support member to the motor vehicle. A light transmitting lens is disposed in the opening of the support member. The lens enables light to project from an interior of the support member to an exterior of the support member to illuminate a predetermined area in proximity to the motor vehicle.

SUMMARY OF THE INVENTION

This invention is directed to an exterior rear view mirror assembly including a housing and a reflective mirror supported by the housing and arranged in a rearwardly facing direction. A support member has an outboard end attached to the housing and an inboard end secured to an outer surface of a motor vehicle. The support member includes an opening. A light transmitting lens is disposed in the opening of the support member. The lens enables light to project from an interior of the support member to an exterior of the support member to illuminate a predetermined area in proximity to the motor vehicle.

This invention is also directed to an exterior rear view mirror system including a housing and a reflective mirror supported by the housing and arranged in a rearwardly facing direction. A support member has an outboard end attached to the housing and an inboard end secured to an outer surface of a motor vehicle. The support member includes an opening. A light transmitting lens is disposed in the opening of the support member. The lens enables light to project from an interior of the support member to an exterior of the support member to illuminate a predetermined area in proximity to the motor vehicle. A light assembly includes a housing having a light source therein. The light assembly housing is secured within the mirror housing, and the light source is operable to generate a light for projection through the lens. The light source is adjustable to project light through the support in a plurality of directions. A switch selectively activates the light source. A speed sensor generates a vehicle speed signal that varies in accordance with the speed of the vehicle. A timer receives the speed signal and receives an activation signal. The timer actuates the light source in accordance with the activation signal and the speed signal.

For a more complete understanding of the invention, its objects and advantages, reference should be made to the following specification and to the accompanying drawings.

BRIEF DESCRIPTION OF THE DRAWINGS

The drawings, which form an integral part of the specification, are to be read in conjunction therewith, and like reference numerals are employed to designate identical components in the various views:

FIG. 1 is a rear perspective view of a mirror assembly arranged in accordance with the principles of the present invention;

FIG. 2 is a front perspective view of the mirror assembly of FIG. 1;

FIG. 3 is an elevational bottom view of the mirror assembly of FIG. 1;

FIG. 4 is a rear perspective view of a mirror assembly showing an approach light mounted in both portions of the vehicle attachment member;

DESCRIPTION OF THE PREFERRED EMBODIMENTS

Figure 5:
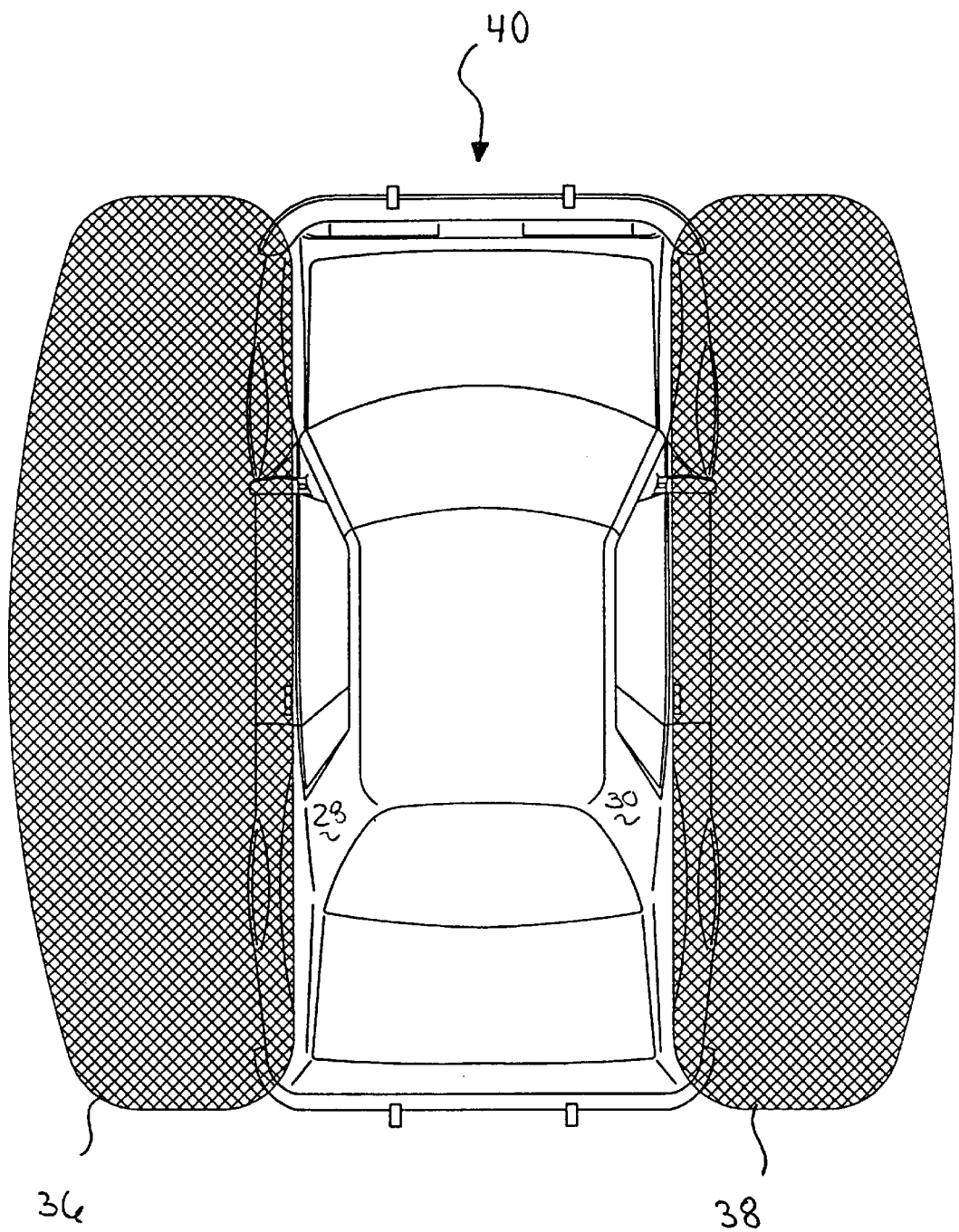
FIG. 5 is a plan view of a vehicle showing an exemplary light pattern of the mirror assembly of FIGS. 1–4.
Figure 6:
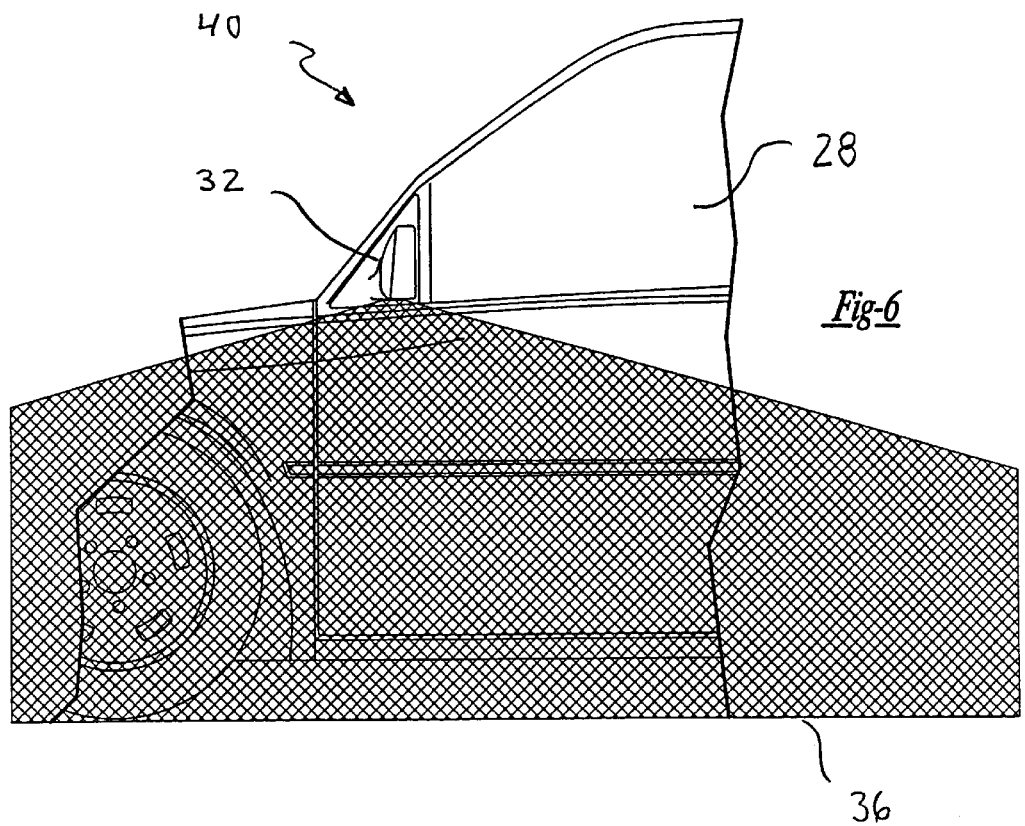
FIG. 6 is a left side view of the vehicle showing an exemplary light pattern of the mirror assembly of FIGS. 1–4.
Figure 7:
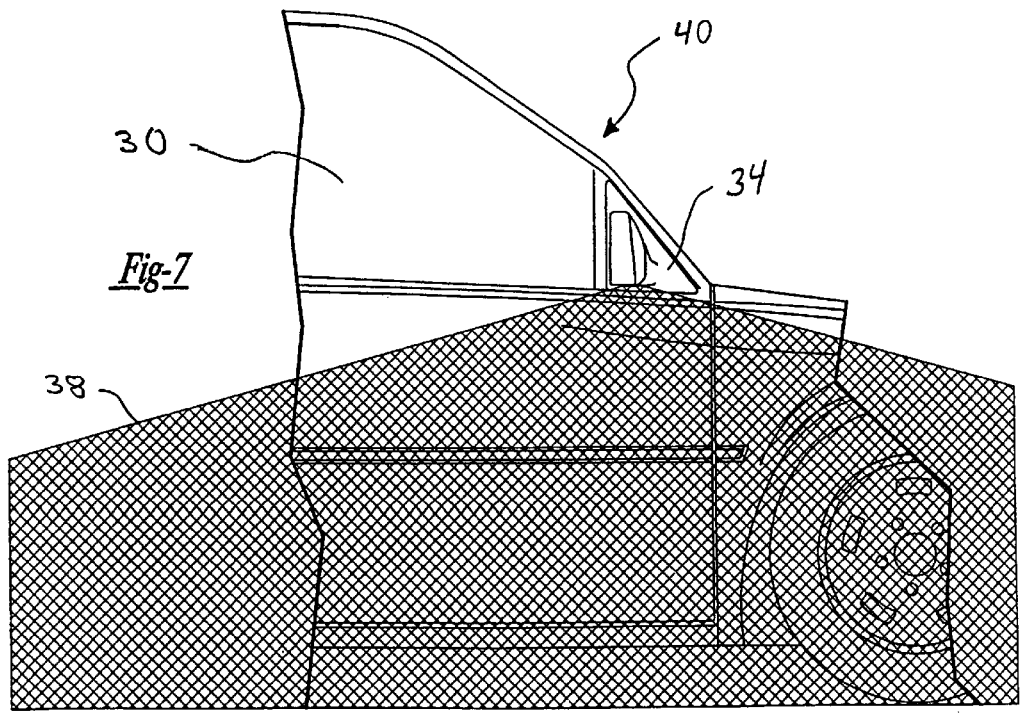
FIG. 7 is a right side view of the vehicle showing an exemplary light pattern of the mirror of FIGS. 1–4 configured for attachment to the right side of a vehicle.

Referring now to the figures, and in particular FIGS. 1–3, a mirror assembly 10 includes a housing 12 which houses and supports a reflective element 14, such as mirror glass. Mirror assembly 10 of the present invention will be described with respect to an exterior driver side rear view mirror which enables the vehicle operator to view an area beside and rearward with respect to the vehicle. Housing 12 connects to an attachment member 16 including a sail portion 18 and an integral, laterally projecting support arm or bracket portion 20. The interconnection between housing 12 and attachment member 16 enables housing 12 to pivot with respect to the support arm portion 20. Particularly, housing 12 pivots rearward and forward with respect to support arm portion 20. Support arm portion 20 is integrally formed with sail portion 18 which attaches to a vehicle 40 as shown in FIGS. 5–7. Sail portion 18 attaches to vehicle 40 via threaded posts or other connectors and is typically a one or two-piece component, as is conventional in the art. Mirror assembly 10 typically attaches to a forward portion of either the driver or passenger side doors of vehicle 40. As will also be described herein, a seal is typically interposed between sail portion 18 and vehicle 40 to isolate the interior of vehicle 40 from the exterior in the area where sail portion 18 connects to vehicle 40.

With respect to a particular feature of the present invention, mirror assembly 10 includes an approach light 22 located in a bottom surface 24 of support arm portion 20. Approach light 22 is typically disposed in an opening 26 of bottom surface 24. Approach light 22 may be implemented using any of a number of light sources, including light modules, light emitting diodes (LEDs), light paths, light pipes, fiber optic cables, and the like which will be described further herein.

FIG. 4 depicts an alternative configuration for approach light 22 and opening 26 formed in bottom surface 24 of support arm portion 20. In particular, opening 26 and approach light 22 are formed further inboard than approach light 22 of FIGS. 1–3. Approach light 22 extends from bottom surface 24 of support arm portion 20 into sail portion 18 and partially curves downward to follow the contour of the integral sail portion 18 and support arm portion 20 of attachment member 16.

Approach light 22 typically illuminates an area in proximity to vehicle 40 as shown in FIGS. 5–7. FIGS. 5–7 depict a vehicle 40 having a driver side 28 and a passenger side 30. Driver side 28 includes a driver side mirror assembly 32, and passenger side 30 includes a passenger side mirror assembly 34. Each of driver side mirror assembly 32 and passenger side mirror assembly 34 are configured as described above with respect to mirror assembly 10. Driver side mirror assembly and passenger side mirror assembly 34 include an approach light 22 which illuminates an area or zone generally adjacent the respective mirror assemblies 32, 34 in proximity to the respective sides 28, 30 of vehicle 40. This area may optionally include illuminating at least a portion of the side of vehicle 40. Specifically, approach light 22 of driver side mirror assembly 32 illuminates an area 36 generally beneath driver side mirror assembly 32. Similarly, approach light 22 of passenger side mirror assembly 34 illuminates an area 38 generally beneath passenger side mirror assembly 34 in proximity to passenger side 30. As will be understood by those skilled in the art, the direction and dispersion of approach light 22 may be varied in order to correspondingly vary the respective areas 36, 38 in order to meet various vehicle safety requirements and to provide suitable lighting.

Figure 8:
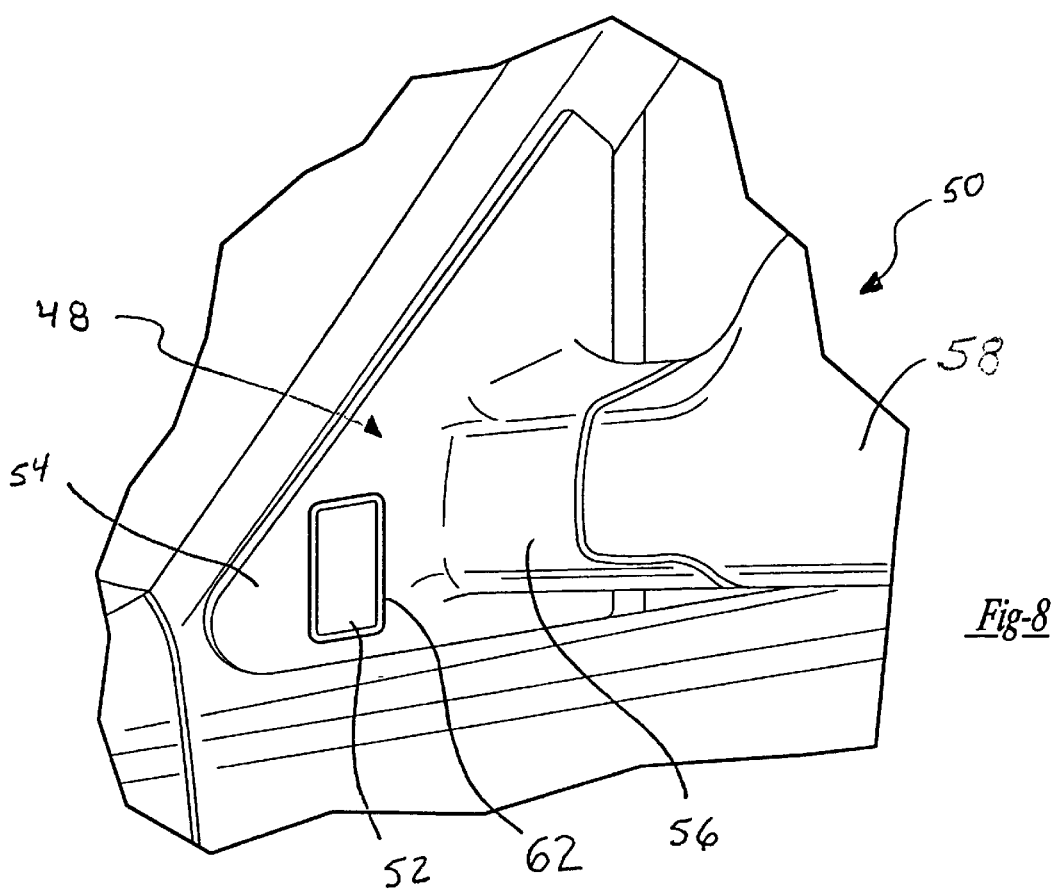
FIG. 8 is a front perspective view of a mirror assembly having an approach light in the sail portion of attachment member.
Figure 9:
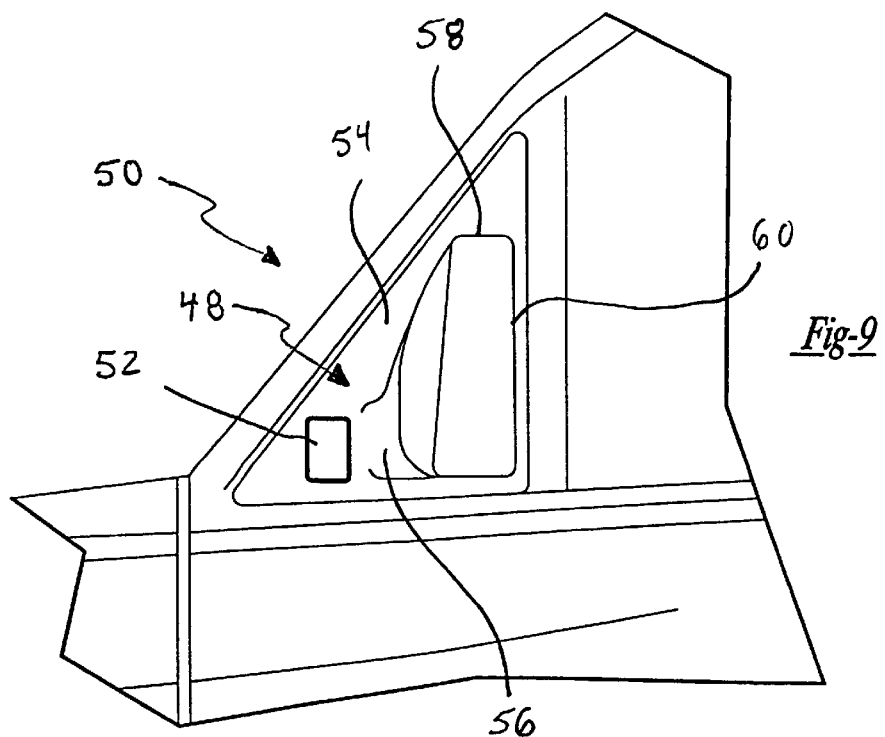
FIG. 9 is a side view of the mirror assembly of FIG. 7.

FIGS. 8 and 9 depict an alternate embodiment for placing an approach light in the mirror assembly. Mirror assembly 50 includes an approach light 52 formed in the sail portion 54 of attachment member 48. Mirror assembly 50 is configured similarly to mirror assembly 10 of FIGS. 1–3 except approach light 22 is placed in sail portion 54 rather than support arm portion 56. Mirror assembly 50 includes a mirror housing 58 for housing and supporting a reflective element 60. Mirror housing 58 pivotally connects to support arm portion 56 as described above with respect to FIGS. 1–3. Support arm portion 56 in turn attaches to sail portion 54. Sail portion 54 mounts to the vehicle 40 of FIGS. 5–7, as described above with respect to FIGS. 1–3. Approach light 52 may be implementing using any of a number of light sources, including light modules, LEDs light paths, and other light modules, many of which will be described further herein. Approach light 52 may be configured to illuminate areas adjacent vehicle 40 similarly to those areas as described above with respect to FIGS. 5–7.

Figure 10:
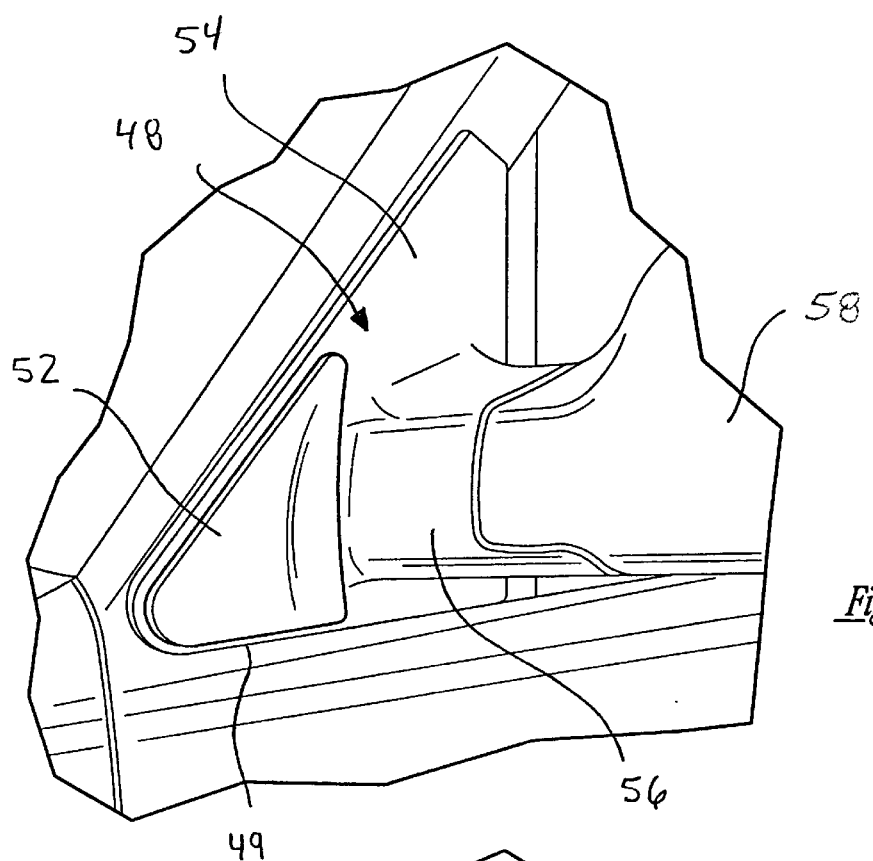
FIG. 10 is an alternative configuration for disposing an approach light in the sail portion of the attachment member.

FIG. 10 depicts an alternate configuration for placing an approach light in sail portion 54 of attachment member 48. In particular, approach light 52 is formed to generally coincide with a forward section 49 of sail portion 54. As shown in FIG. 10, approach light 52 generally consumes substantially all of the area forward of support arm portion 56 of attachment member 48. Such a configuration provides a particularly decorative appearance for mirror assembly 50 and vehicle 40.

Figure 11:
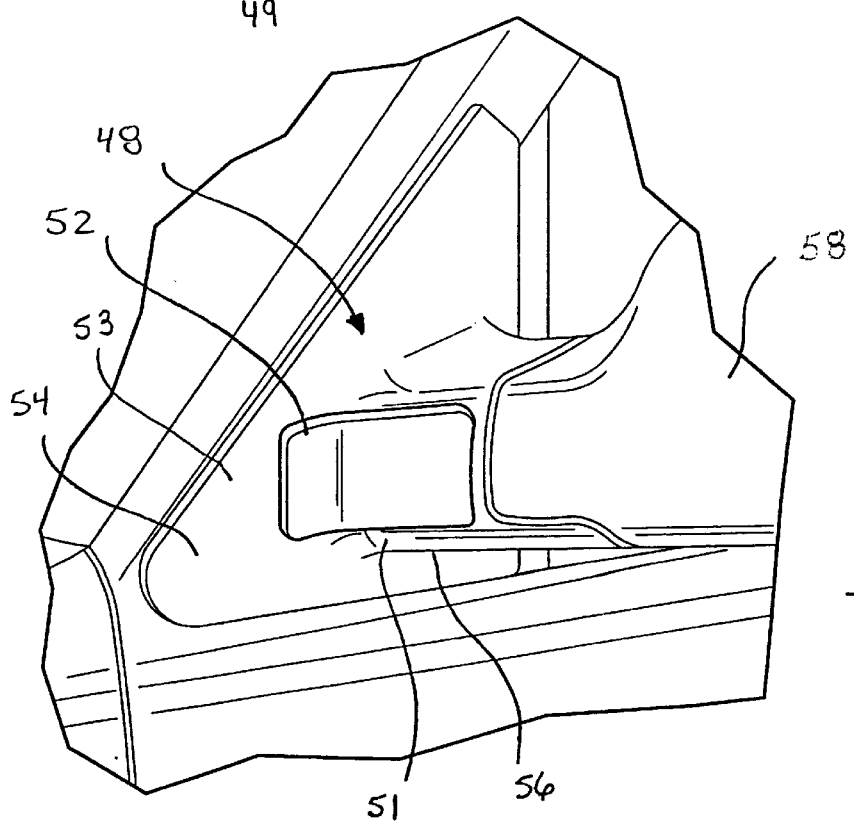
FIG. 11 is a front perspective view of an alternative configuration showing the approach light in both the support arm portion and the sail portion of the attachment member.

Yet another alternative configuration for placing an approach light in attachment member 48 may be found with respect to FIG. 11. Approach light 52 is formed to generally coincide with a forward vertical wall 51 of support arm portion 56 and a vertical side wall 53 of sail portion 54. Approach light 52 follows the contours of the integral intersection between support arm portion 56 and sail portion 54 of attachment member 48. In this configuration, approach light 52 offers illumination properties as described above and also offers an improved, decorative appearance and improved aerodynamic shape.

Figure 12:
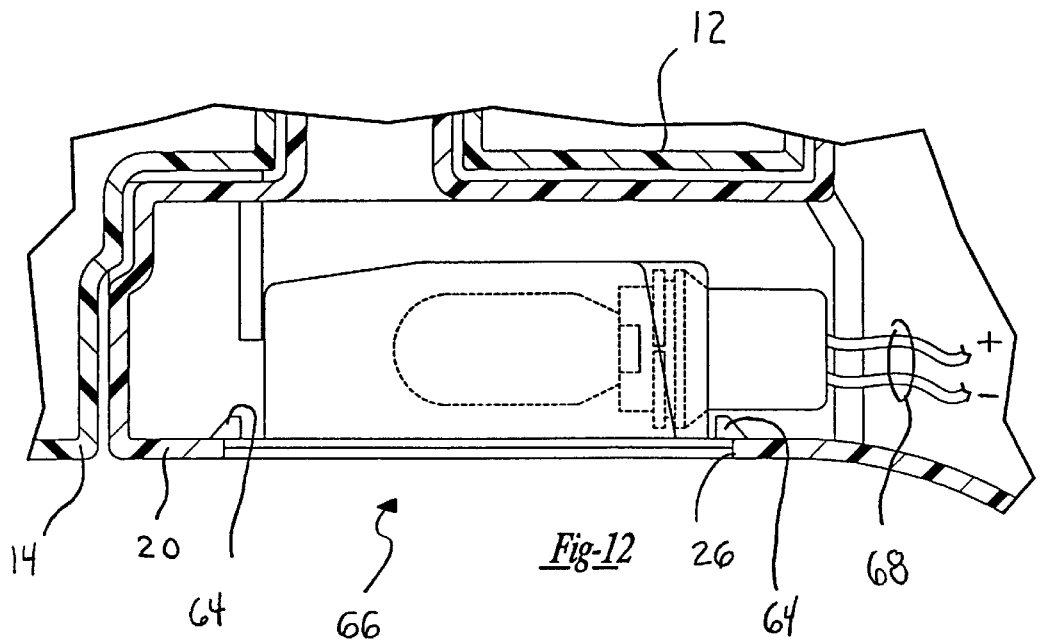
FIG. 12 is a vertical sectional view of the mirror bracket of FIG. 1 showing an approach light module mounted in the projecting support arm portion of the attachment member.

FIG. 12 shows a sectional view of support arm portion 20 of FIGS. 1–3 including approach light module 66. Approach light module 66 forms an integral unit including a case, a reflector, and a lens, mounted in support arm portion 20. A wiring harness 68 provides electrical power to approach light module 66 from electrical connections located within vehicle 40. Harness 68 typically includes negative and positive electrical leads for providing electrical power to a light source formed in approach light module 66. Approach light module 66 mounts in opening 26 of support arm portion 20 using snap connectors 64. Support arm portion 20 engages snap connectors 64 to enable efficient and positive connection of approach light module 66 to support arm portion 20. Approach light module 66 preferably includes a shape formed to coincide with the shape of opening 26 formed in support arm portion 20 to enable approach light module 66 to seal opening 26. It will be understood by one skilled in the art that a similarly configured approach light module 66 may be installed into opening 62 of sail portion 54 so that approach light module 66 may be adapted for application in mirror assembly 50.

Figure 13:
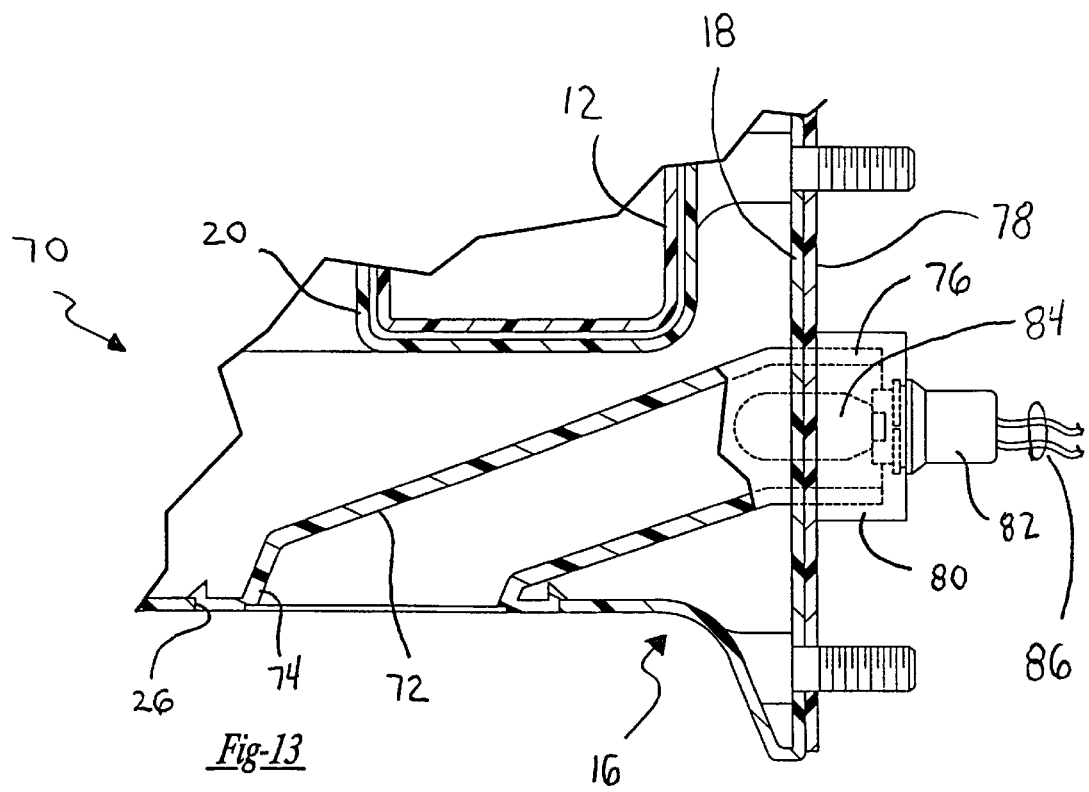
FIG. 13 is a vertical sectional view of a mirror assembly having a light path for providing light to the support arm portion of the attachment member.

FIG. 12 depicts one configuration for providing light to opening 26 of support arm portion 20. An alternative configuration for providing light to opening 26 may be found with respect to FIG. 13. FIG. 13 depicts a sectional view of support arm portion 20 of mirror assembly 70 including a light path or pipe 72 for transporting light from an inboard portion of vehicle 40 through opening 26. Mirror assembly 70 is similarly configured to mirror assembly 10 of FIGS. 1–3. Particularly, mirror assembly 70 includes a housing 12 for housing and supporting a reflective element. Housing 12 pivotally connects to support arm portion 20 which in turn connects to sail portion 18. Sail portion 18 of attachment member 16 attaches to vehicle 40 to mount the mirror assembly 70 to vehicle 40. A seal 78 interposed between sail portion 18 and vehicle 40 seals the vehicle interior from the vehicle exterior to prevent water from entering vehicle 40 and to reduce wind noise.

Mirror assembly 70 includes a light path or pipe 72. A first end 74 of light path or pipe 72 is located in proximity to opening 26 of support arm portion 20. From first end 74, light path or pipe 72 traverses support arm portion 20 and sail portion 18 to a second end 76 located inboard of sail portion 18. Second end 76 also traverses seal 78 and terminates inboard of seal 78. Second end 76 of light path or pipe 72 includes a socket 80 which receives a connector 82. Connector 82 houses a light source 84 on one end and includes electrical leads 86 for providing electrical power to light source 84. Socket 80 and connector 82 are preferably molded from a plastic material.

Light path or light pipe 72 may assume any of a number of structures including clear, molded plastic, a molded structure lined with reflective material, or a molded material with internal metalizing. FIG. 13 provides a particular advantage of moving light source 84 and electrical connector 82 inboard of seal 78, thereby reducing exposure of light source 84 and connector 82 to water, road salt, dirt, debris, and other elements exterior to the vehicle. Further, a shorter electrical harness provides electrical power to the light source, thereby reducing costs. One skilled in the art will recognize that a similar configuration provides light to opening 62 of mirror assembly 50 of FIG. 8. The light source could also be placed in a centralized location within the vehicle, and a distributed lighting system could supply light from the light source to various locations.

A particularly advantageous feature of the configuration of FIG. 13 is that by placing light source 84 inboard, light source 84 need not be sealed within an enclosure. Consequently, light source 84 may be vented to the interior of the vehicle to provide significantly greater cooling than a sealed light source enclosure as would necessarily be included in approach lights formed in housing 12. Venting light source 84 towards the interior of the vehicle enables installation of a bulb that generates greater heat, which typically implies that the light source outputs brighter light. This brighter light translates into improved lighting output from approach light 22 formed in opening 26. Alternatively, one skilled in the art will recognize that in addition to the light path or light pipe 72 described herein, candidate light sources include light bulbs, light emitting diodes (LED's) fiber optic light pipes, reflective light pipes, fiber optic cables, and conventional light bulbs. Conventional light bulbs include bulbs having electrical contacts at one end, bulbs having electrical contacts at either end, and other combined configurations for such bulbs. The alternatives described herein with respect to venting the light source, as compared to sealing the light source, apply to each of the embodiments described herein.

Figure 14:
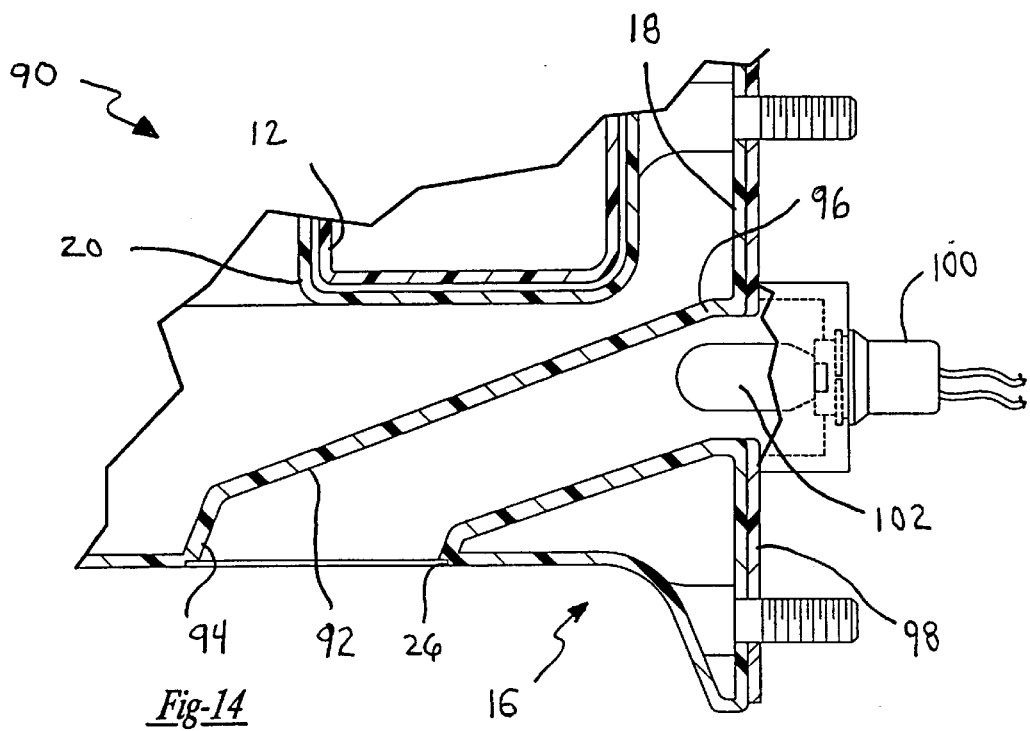
FIG. 14 is a vertical sectional view of a mirror assembly having a light path formed integral to the attachment member.

FIG. 14 shows a portion of a mirror assembly 90 configured similarly to mirror assembly 70 of FIG. 13. Mirror assembly 90 differs from mirror assembly 70 in that mirror assembly 90 includes a light pipe or light path which is integrally molded with attachment member 16 to provide both light transmission properties and structural support for mirror assembly 90. The light pipe or light path 92 includes a first end 94 terminating in proximity to opening 26. Light pipe or path 90 traverses support arm portion 20 and sail portion 18 and terminates at a second end 96. As shown, light path or pipe 92 is integrally molded as part of attachment member 16. Second end 96 of light pipe 92 extends inboard of seal 98. This provides the benefits as described above of moving the light source and electrical connections inboard. Second end 96 of light pipe 92 is preferably molded to provide a receptacle for a connector 100, such as a bayonet connector, which supports light source 102. As discussed above, light path 92 integrally forms part of attachment member 16. Light path 92 preferably is formed as a molded portion, which may be clear or may be lined with metalizing or reflective foil. Light path 92 may be implemented using fiber optic light pipes, reflective light pipes, and fiber optic cables. One skilled in the art will recognize that a similar configuration provides light to opening 62 of mirror assembly 50.

Figure 15:
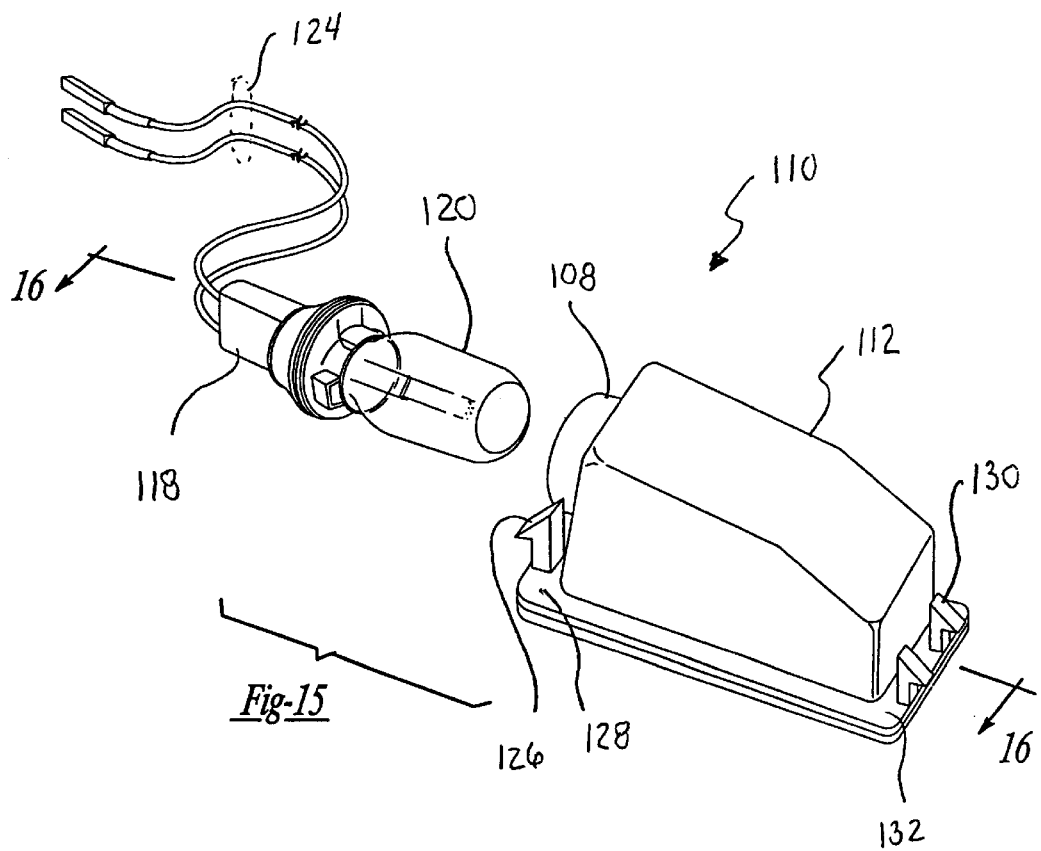
FIG. 15 is a perspective view of an approach light module mounted in the support arm portion of the attachment member.
Figure 16:
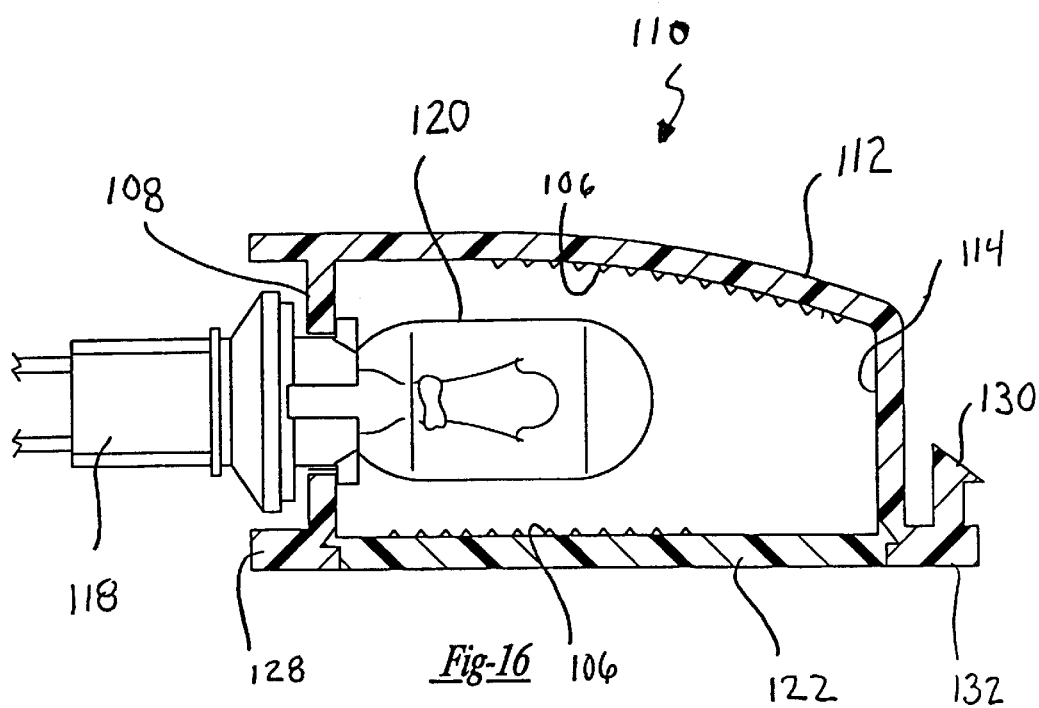
FIG. 16 is a vertical sectional view of the approach light module of FIG. 14.

FIGS. 15 and 16 show an approach light module as may be used in the above described embodiments. Approach light module 110 includes a case or shell 112. Case 112 encloses a reflector 114 formed to fit within case 112. Reflector 114 includes a socket 108, which may be threaded, for receiving a connector 118, such as a bayonet connector, which supports and provides power to a light source 120. When electrical power is applied to light source 120, light source 120 outputs light which is reflected by reflector 114 and exits approach light module 110 through lens 122. Lens 122 may include a plurality of prisms 106 in order to disperse light output by light source 120 in any of a number of various, predetermined directions. An electrical wiring harness 124 provides electrical power to light source 120 in order to activate light source 120. Case 112, lens 122, and socket 108 preferably cooperate to seal approach light module 110 from outside elements. Approach light module 110 mounts within opening 26 of mirror assembly 10 using tabs 126 formed on an inboard section 128 and tabs 130 formed on an outboard section 132 of approach light module 110. Tabs 126 and 130 cooperate with the edge of opening 26 or corresponding catches formed in opening 26 of support arm portion 20.

In an alternative configuration, approach light module 110 receives a connector for supporting light source 120. The side of connector opposite light source 120 supports a male portion of an electrical socket. A female connector portion of an electrical socket formed integrally with support arm portion 20 receives the male portion of the electrical socket formed in connector 118. The female portion of the socket may be formed integral with a bayonet connector and mounted in support arm portion 20. In this manner, the inboard electrical connection provides a retaining force for approach light module 110 in support arm portion 20.

Figure 17:
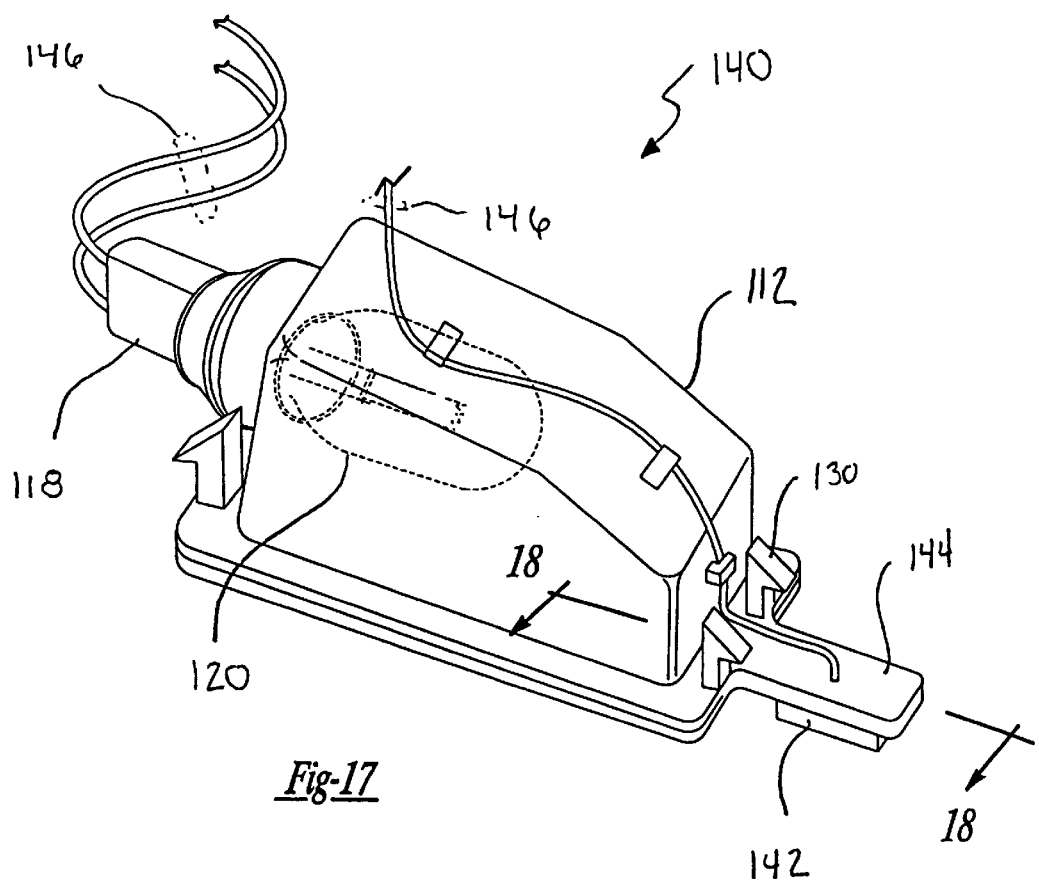
FIG. 17 is a perspective view of an approach light module mounted in the support arm portion of the attachment member including a temperature sensor.
Figure 18:
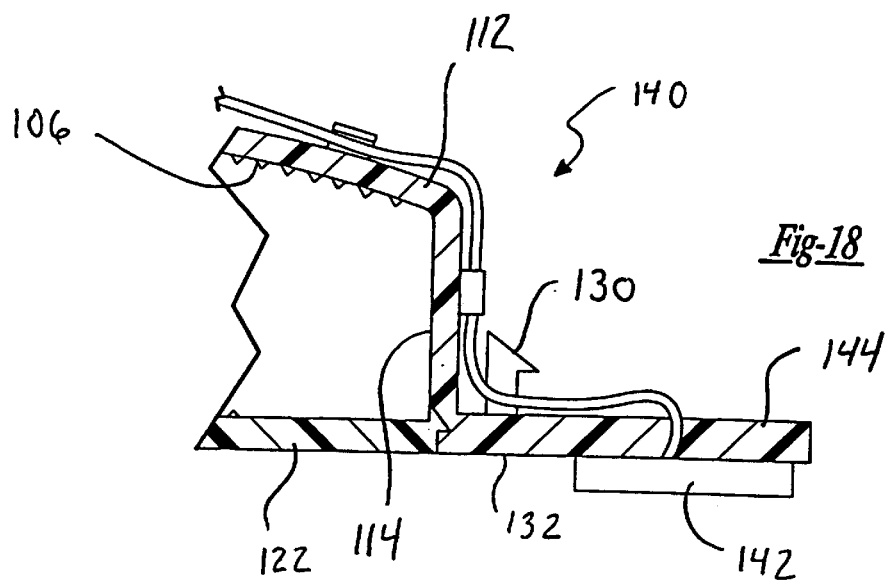
FIG. 18 is a partial vertical sectional view of the approach light module of FIG. 16.

FIGS. 17 and 18 depict an alternate embodiment of an approach light module 140. Approach light module 140 includes a temperature sensor 142. Approach light module 140 is substantially as described above with respect to approach light module 110. Temperature sensor 142 mounts to a tang 144 formed external to and integral with case 112. Temperature sensor 142 preferably comprises a thermister which has a resistance that varies in accordance with ambient temperature. A wiring harness 146 provides electrical connections to temperature sensor 142. The resistance through temperature sensor 142 is monitored by an electrical circuit which generates an output in accordance with the temperature sensed by temperature sensor 142. In this manner, approach light module 140 provides a dual function of illuminating the area in proximity to the mirror and also provides a convenient, external position for temperature sensor 142.

Figure 19:
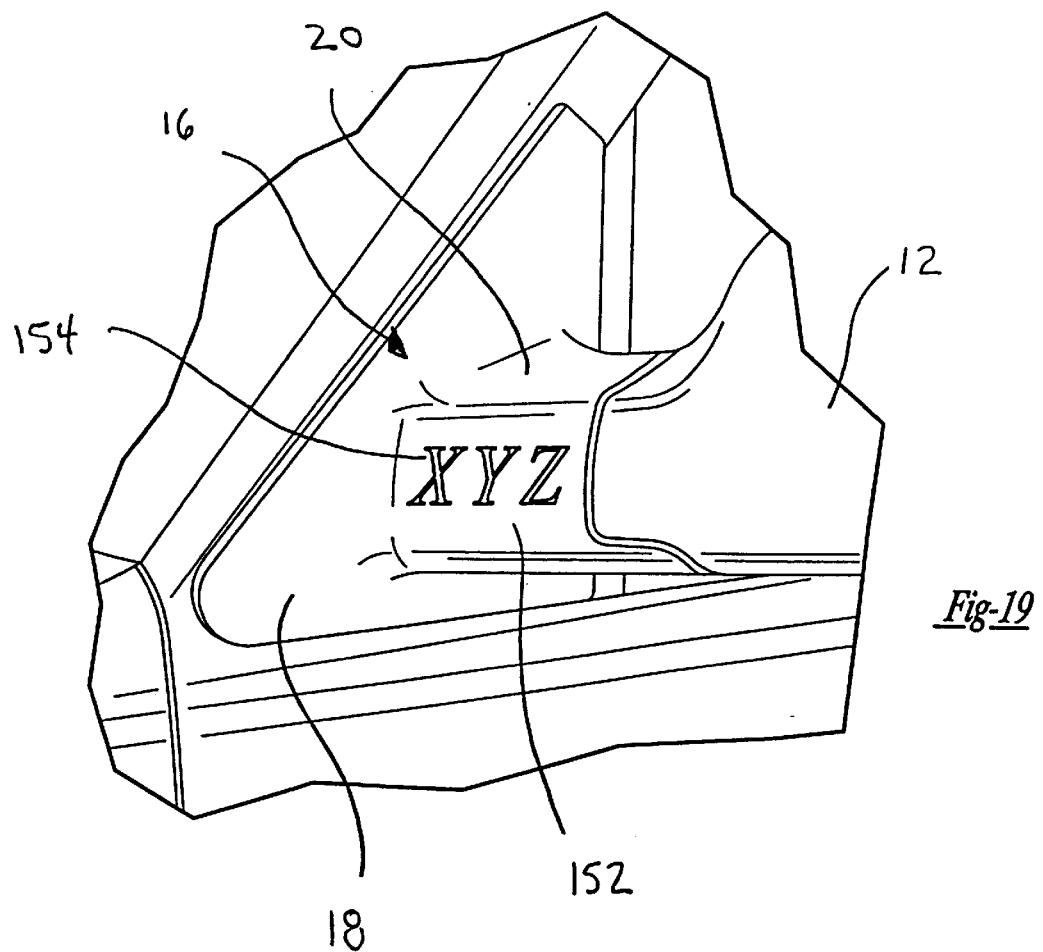
FIG. 19 is a front perspective view of a mirror assembly having an illuminable display area formed on the support arm portion of the attachment member.

FIG. 19 depicts yet another embodiment of the present invention, namely, placing translucent advertising indicia or the like on support arm portion 20 and illuminating such indicia using reflected or directed light from approach light 22. Indicia 152 may include lettering 154. Indicia 152 preferably enables transmission of light therethrough in order to illuminate indicia 152. Illuminating light may be provided using the light paths or pipes as described above routed from a light source as described above to an interior portion of indicia 152 to generate illumination generally outward from support arm portion 20. Such light paths or pipes have been described above with respect to FIGS. 13 and 14. Alternatively, a light path may be routed from any of the approach light modules described above internally to indicia 152 in order to illuminate indicia 152. Indicia 152 may include colored lettering in order to draw additional attention to the advertising indicia.

Figure 20:
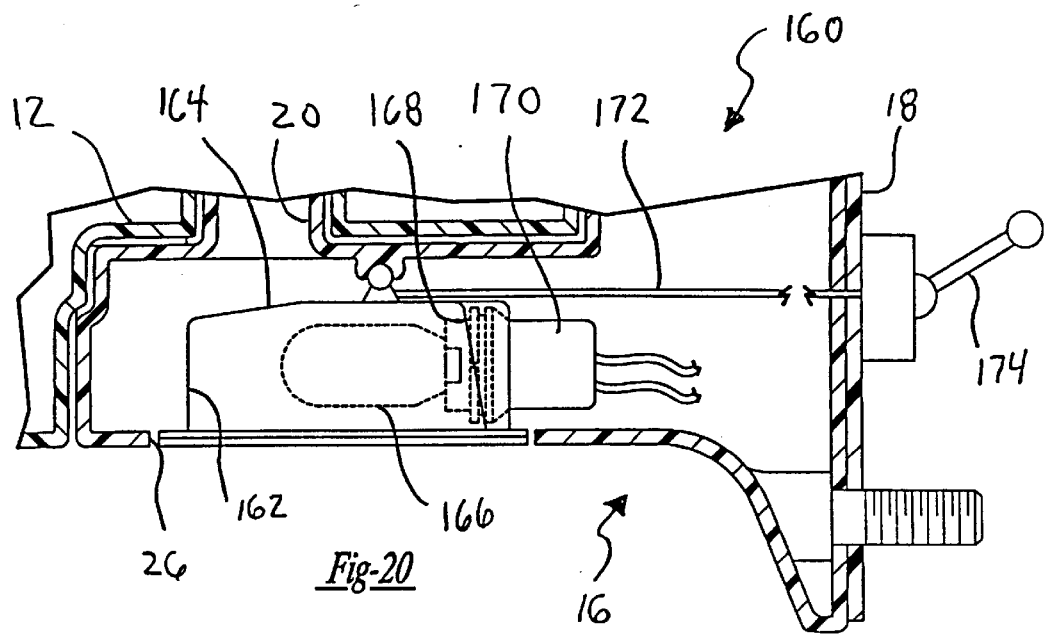
FIG. 20 is a vertical sectional view of an approach light module mounted in the support arm portion of the attachment member in which the light output by the module may be directed by the vehicle operator.

FIG. 20 depicts yet another feature of the present invention. It may be desirable to provide an adjustable approach light module 160 mounted in opening 26 of support arm portion 20. In particular, adjustable approach light module 160 includes a reflector 162 mounted within a case or shell 164. Reflector 162 supports a light source 166 mounted within an opening 168 using a connector 170, such as a bayonet connector. Reflector 162 pivots within case 164 in order to reflect light from light source 166 in a predetermined direction. In a preferred embodiment, linkage 172 attaches to reflector 162 and displaces reflector 162 in accordance with input from a control member 174 mounted inboard on the vehicle for adjustment by the vehicle operator. One of ordinary skill in the art will recognize that other adjustment means may be utilized to direct illumination from light source 166. Adjustable approach light module 160 thus enables directionalization of the light output from approach light module 160 in order to illuminate predetermined areas either rearward, forward, or outboard of a nominal zone of illumination provided by adjustable approach light module 160.

In addition to providing an approach light as described with respect to FIG. 20, one skilled in the art will recognize that other configurations for directing light from approach light 22 and approach light 52 may be implemented. In particular, in an approach light module such as described with respect to FIGS. 15 and 16, the approach light module may be detachable from support arm portion 20 or sail portion 54 so that the operator may use the approach light module as a hand held light, such as a flashlight. One skilled in the art will recognize that such a configuration may be implemented by lengthening a wire harness that supplies power to the approach light module. The lengthened wire harness may be extended from support arm portion 20 and sail portion 54 in order to provide such a feature.

Figure 21:
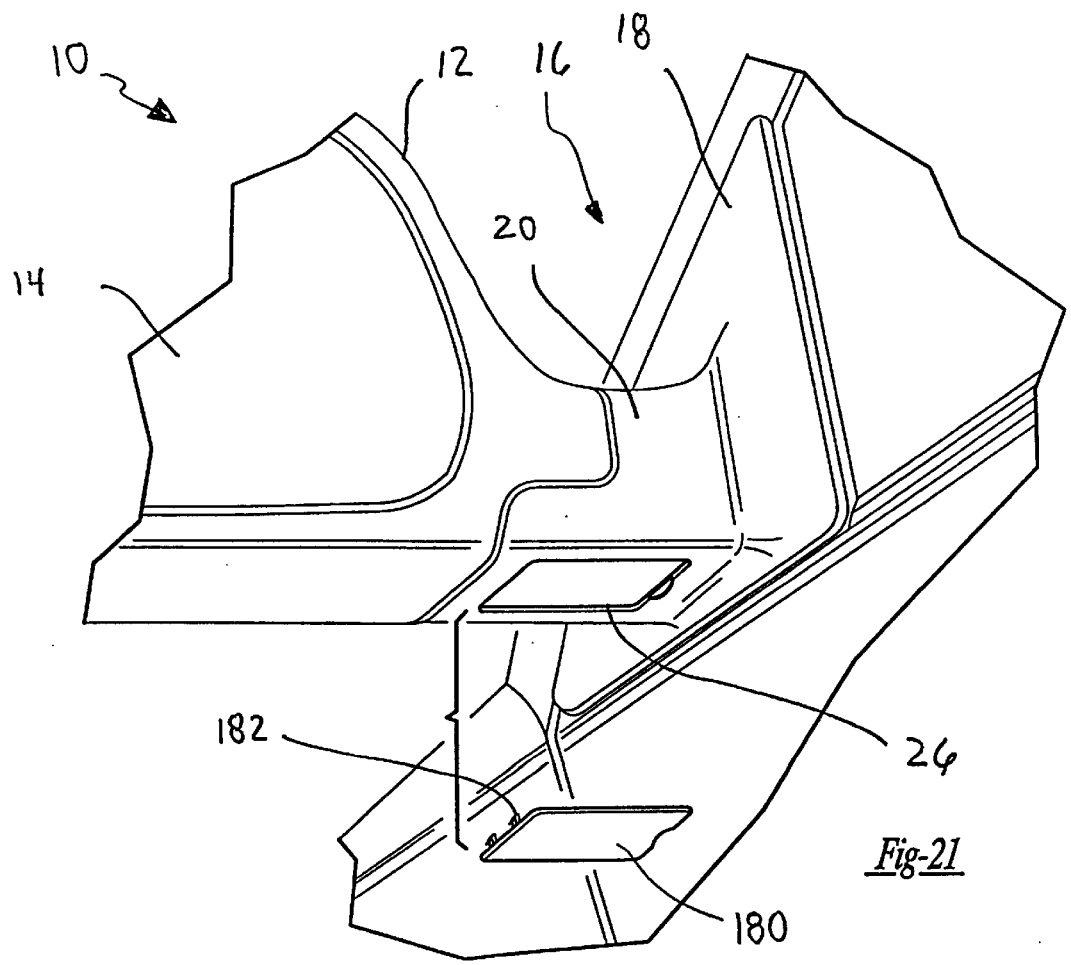
FIG. 21 is a perspective bottom view of a mirror assembly showing a knockout formed in the support arm portion of the attachment member to enable optional installation of an approach light module.

In some situations, vehicle manufacturers may prefer not to offer an approach light module as a factory installed option on the vehicle. Accordingly, it may be desirable to provide flexibility in the mirror assembly for installing an approach light as an aftermarket option. FIG. 21 depicts mirror assembly 10 configured for installation of approach light 22 as an aftermarket option. When offering mirror assembly 10 as an aftermarket option, a knockout or cover 180 sealably covers opening 26 yet enables convenient removal for installation of approach light 22. Knockout 180 includes tabs 182 which engage opening 26. The embodiment of the knockout 180 described herein may be configured for application on any of the approach light configurations described above.

Figure 22:
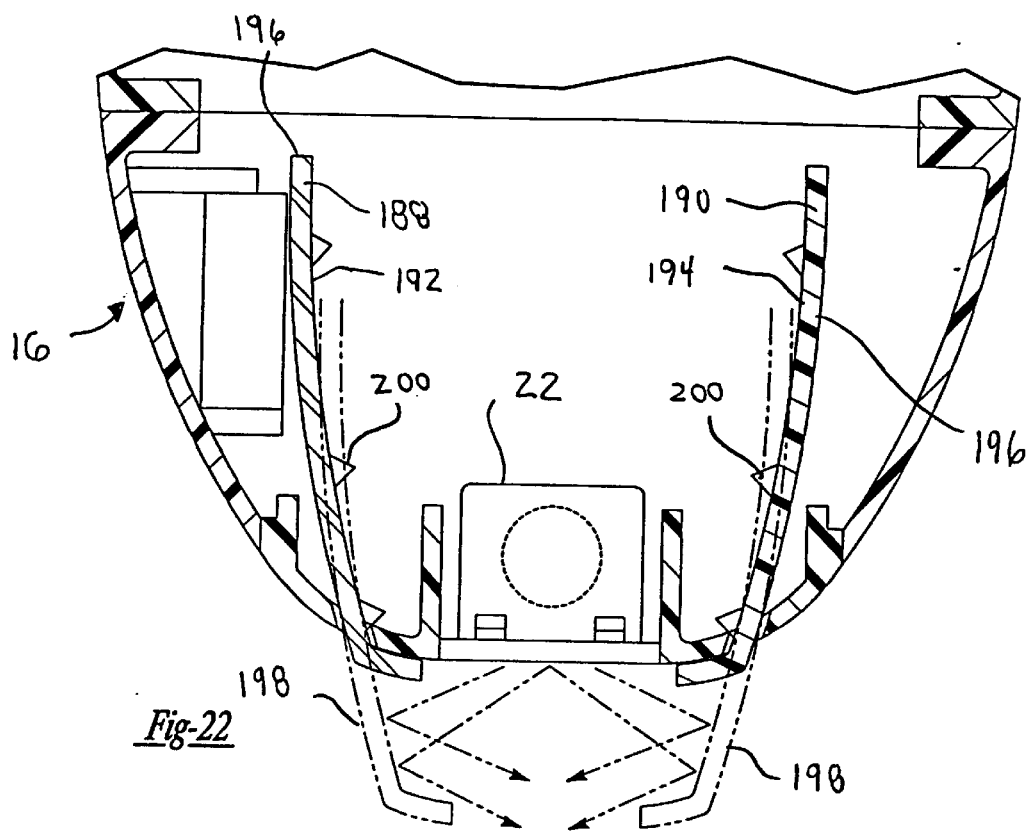
FIG. 22 is a vertical sectional view of the support arm portion of the attachment member showing slidably recessed reflectors so that light output from the support arm portion may be reflected in a predetermined direction.

As an alternative, or in addition to, implementation of an adjustable approach light module 160 and similar configurations, as described above, the approach light may remain fixed, and illumination from the approach light module may be directed through use of adjustable reflectors. With particular reference to FIG. 22, approach light 22 is shown in attachment member 16. An adjustable reflector 188 is preferably slidably mounted forward of approach light 22, and an adjustable reflector 190 is preferably slidably mounted rearward of approach light 22. Reflector 188 includes a rearward reflective surface 192, and reflector 190 includes a forward reflective surface 194. Each reflector 188, 190 may be displaced to a plurality of positions from a fully recessed position shown in solid lines to a fully extended position shown in phantom. Each reflector 188, 190 preferably includes a plurality of tabs or stops 200 which provide variable detent positions intermediate to and including recessed position 196 and extended position 198. By variably positioning reflectors 188 and 190, light output by approach light 22 may be reflected in a respective rearward or forward direction. This provides additional light illuminating the forward or rearward portions of the vehicle, as may be useful for changing a tire or illuminating particular areas in various parking facilities. It will be understood by one skilled in the art that the reflectors described herein with respect to FIG. 22 may be implemented in any of the approach light configurations described herein.

Figure 23:
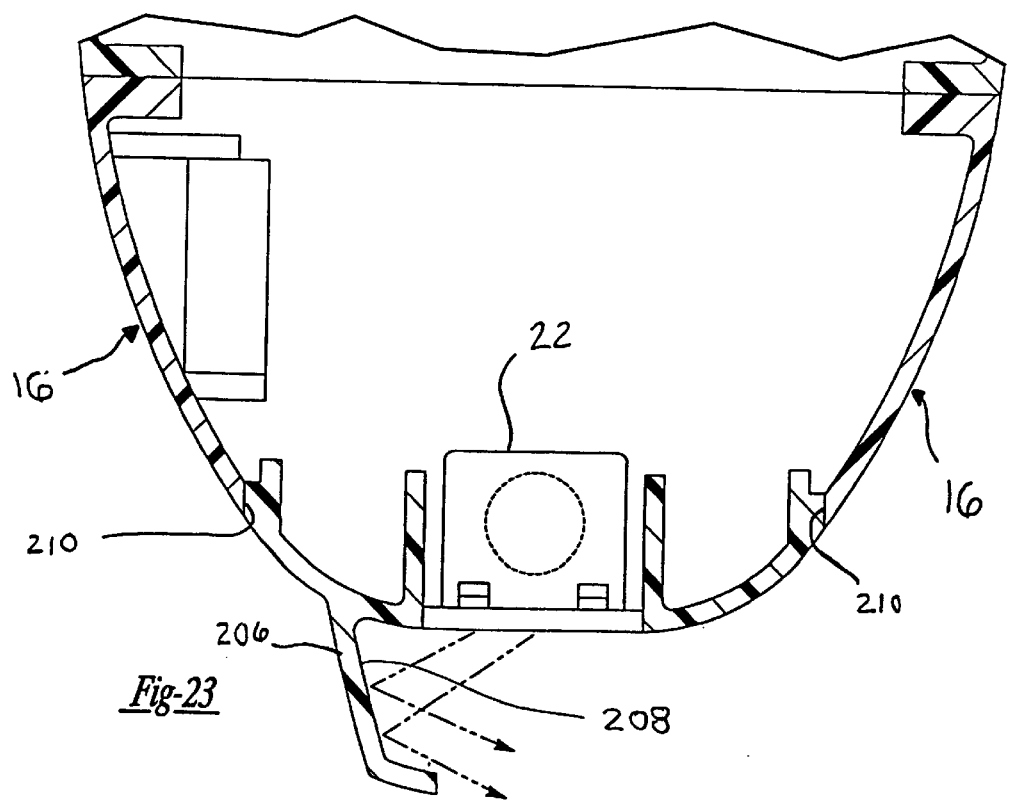
FIG. 23 is a vertical sectional view of the support arm portion of the attachment member showing a permanent reflector to minimize illumination from the support arm portion in a predetermined direction.

In addition to positionable reflectors 188, 190, it may be desirable to direct illumination from approach light 22 in a predetermined direction in particular situations. Such a requirement may exist to meet vehicle safety standards of particular countries. Accordingly, FIG. 23 depicts a mirror assembly 10 including an approach light 22 having a louver 206 including a reflective surface 208 mounted in proximity to approach light 22. Light output by approach light 22 reflects off of reflective surface 208 in a predetermined direction, substantially restricting approach light from illuminating a direction beyond louver 206. Louver 206 may be integrally molded with attachment member 16 or other components of mirror assembly 10. Alternatively, louver 206 may be an individual component having tabs or tangs (not shown) corresponding to and inserted into mounting holes 210 formed in support arm portion 20, sail portion 18, or other suitable mirror assembly component. Thus, by providing mounting holes 210 around approach light 22, louver 206 may be selectively installed in order to meet safety standards of a particular country where a vehicle is most likely to be sold.

Figure 24:
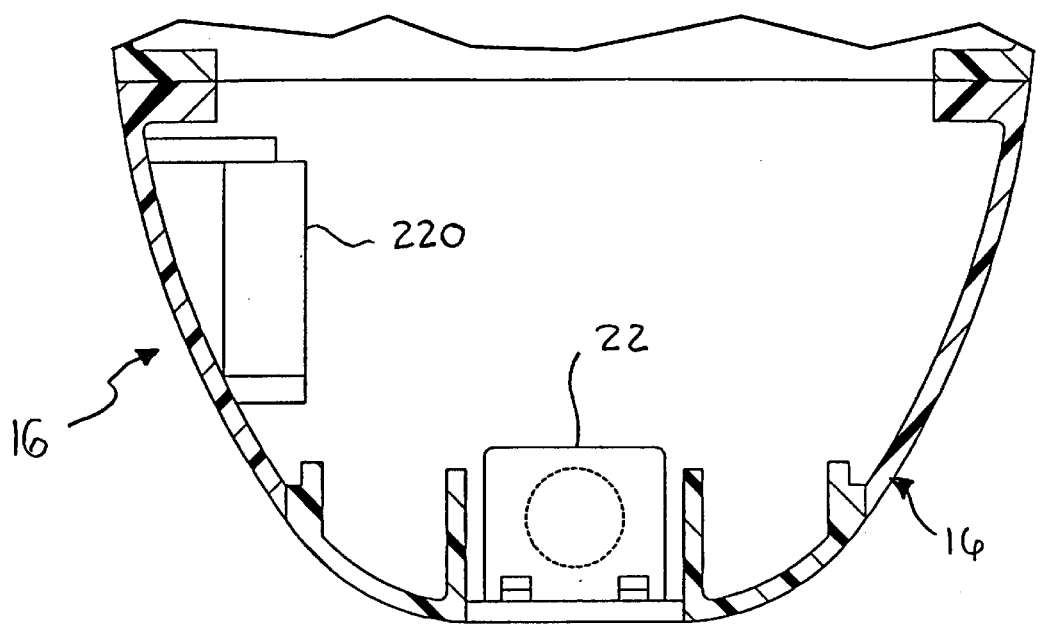
FIG. 24 is a vertical sectional view of the support arm portion of the attachment member showing an electronic module which may function as a transmitter or receiver of electromagnetic signals.

In addition to the many configurations described herein, mirror assembly 10 provides a convenient, outboard location for mounting components which operate most efficiently when placed outboard of the vehicle. Further, because a wiring harness must be routed to supply electrical power to mirror assembly 10, mirror assembly 10 may also be used to house other electronic components, particularly those which function best outboard of the vehicle. FIG. 24 depicts a sectional view of mirror assembly 10 including an approach light 22 and also including a transceiver 220. Transceiver 220 may transmit and/or receive electromagnetic signal for any of the number of remote systems, including infrared remote (IR) systems, global positioning systems (GPS), a centralized vehicle alert system, and the like. Transceiver 220 interconnects to a control module, described herein, via a wiring harness. The wiring harness may be integrally formed with wiring for powering approach light 22.

Figure 25:
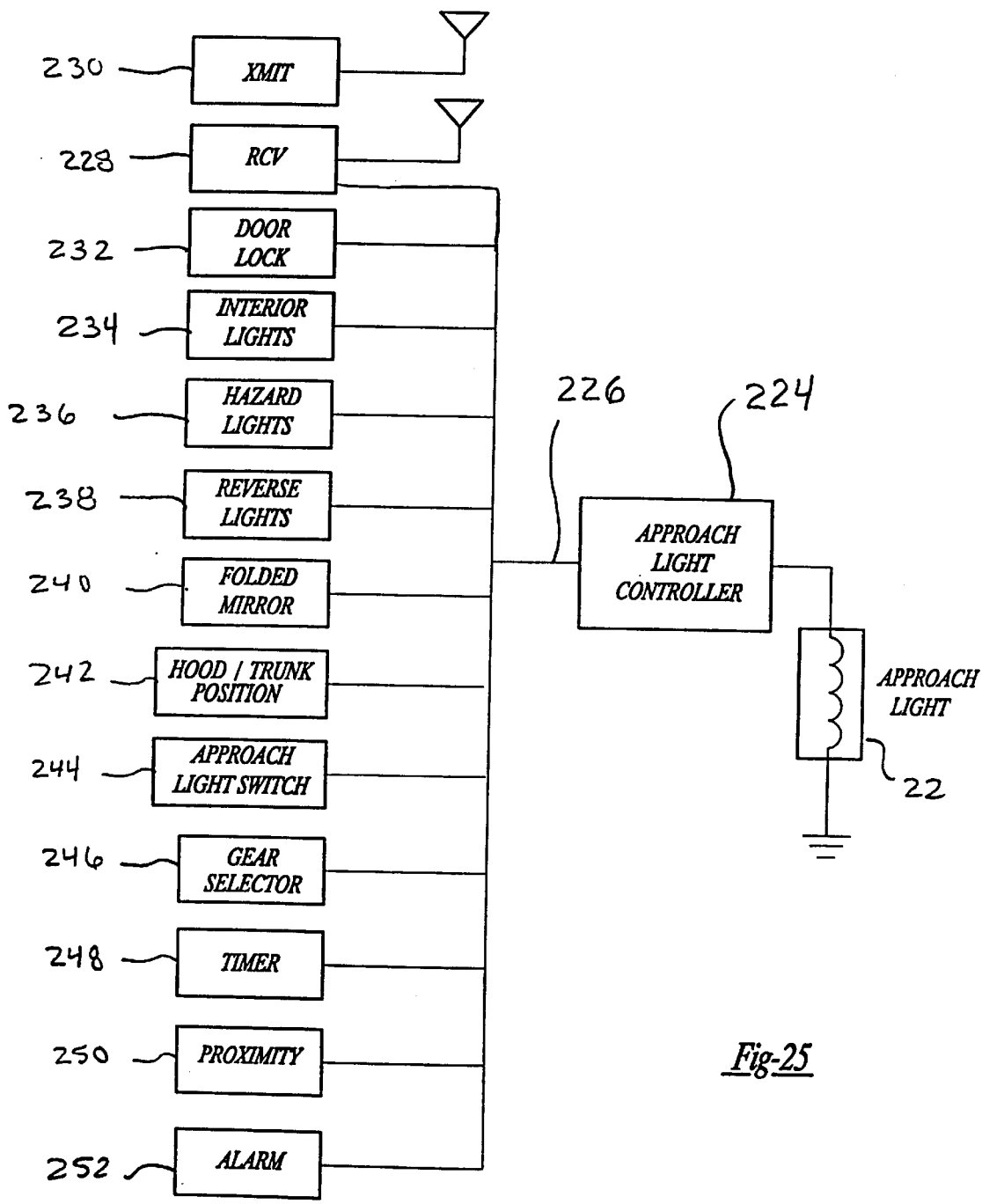
FIG. 25 is a block diagram of a possible control circuit for controlling operation of the approach light.

FIG. 25 depicts a control circuit for activating approach light 22. Approach light 22 receives input from an approach light controller 224. Approach light controller 224 may be integral with a body or other vehicle controller or may operate independently. Approach light controller receives input signals provided on vehicle data bus 226. Alternatively, approach light controller may receive signals individually from any of a number of inputs, rather than detecting signals placed on vehicle data bus 226.

Any of a number of components can place signals on vehicle data bus. For example, receiver 228 receives input signals, such as IR signals, from transmitter 230 such as a key FOB. When receiving a signal from transmitter 230, receiver 228 outputs a signal on vehicle data bus 226. Any of a number of components may place information on vehicle data bus 226 for evaluation by approach light controller 224. For example, the state of the vehicle door lock 232 generates one or more signals on vehicle data bus 226 when the doors are in either of a locked or unlocked state. Similarly, the state of interior lights 234, hazard lights 236, and reverse lights 238 each generates a separate signal output on vehicle data bus 226. The position of housing 12 with respect to support arm portion 20 activates a sensor 240 which generates a signal on vehicle data bus 226. The position of the hood or trunk activates a sensor 242 which generates at least one signal output on vehicle data bus 226. An approach light switch 244 for manual activation of approach light 22 also outputs a signal on vehicle data bus 226. The position of gear selector 246 also generates a signal on vehicle data bus 226. A timer 248 may be activated in accordance with a predetermined event and outputs a signal on vehicle data bus 226 after a predetermined, elapsed time. A proximity sensor 250 generates a signal on vehicle data bus 226 in accordance with proximity of individuals to the vehicle. Further, an alarm system 252 in any of a number of predetermined states generates at least one output signal on vehicle data bus 226. The above-described signals are output on vehicle data bus 226 and input to approach light controller 224. Approach light controller may have any of a number of modes for determining activation of approach light 22 in accordance with the above-described signals.

Two exemplary modes of operation for the circuit of FIG. 25 will be described. In a first mode of operation, actuation of one or more vehicle door locks 232 causes corresponding actuation of approach light 22. Such actuation occurs regardless of whether the vehicle is in motion. Particularly, during operation of the vehicle, approach light 22 may be activated using approach light switch 244. Such activation may occur in response to the operator desiring to view street signs, mailboxes, and individuals approaching the vehicle.

Figure 26:
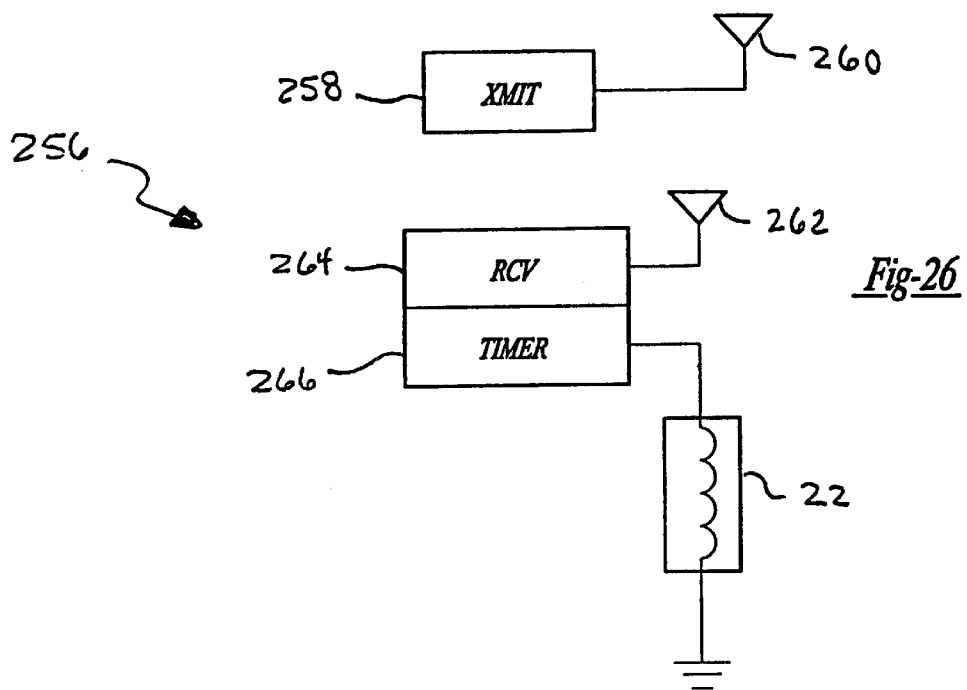
FIG. 26 is a circuit diagram for a control circuit for an approach light having a time-out function.

FIG. 26 depicts a control circuit for a particular implementation for activating approach light 22 of the present invention. Control circuit 256 represents a simplified embodiment of the circuit of FIG. 25. Control circuit 256 includes a transmitter 258, such as a key FOB which outputs a signal through antenna 260. Antenna 260 outputs an electromagnetic signal received by antenna 262 and input to receiver 238. Receiver 264 electronically communicates with timer 266. Upon receipt of an activation signal from transmitter 258, receiver 264 supplies an activation signal to timer 266. Upon receipt of the activation signal, timer 266 outputs an electrical signal to activate approach light 22. Timer 266 maintains activation of approach light 22 for a predetermined time period.

Following the predetermined time period, timer 266 deactivates approach light 22 by removing the electrical energy supplied to approach light 22. The predetermined time period for which timer 266 activates approach light 22 may vary in accordance with specific design considerations. Preferably, the predetermined time period is of a duration sufficient so that an operator approaching the car can activate approach light 22 and so that approach light 22 remains activated so that the operator can enter the vehicle and lock the vehicle to prevent outside intrusion. This time period may be extended to enable the operator additional time to start the vehicle.

Figure 27:
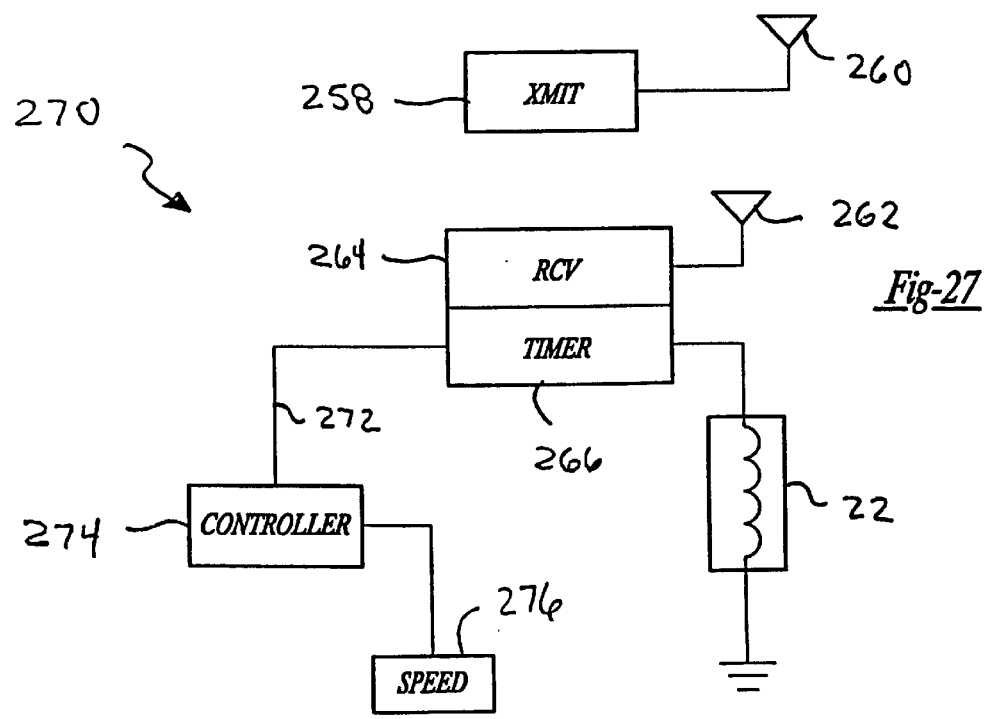
FIG. 27 is a control circuit for an approach light having a time-out function in which the time-out period varies in accordance with the vehicle speed.

FIG. 27 depicts a control circuit 270 for activating approach light 22. Control circuit 270 operates similarly as control circuit 256 described above with respect to FIG. 26. Control circuit 270, however, utilizes a vehicle speed signal to vary the timeout period for approach light 22. As described above, control circuit 270 includes a transmitter 258 which outputs an electromagnetic signal through antenna 260. Antenna 262 detects the electromagnetic signal output by antenna 260 and provides an input signal to receiver 264. Upon receipt of the input signal, receiver 264 sends an activation signal to timer 266. Timer 266 also receives a speed signal from input line 272. A controller 274, such as a vehicle controller, an engine controller, a transmission controller, or the like, outputs a speed signal on input line 272 in accordance with electrical signal received from speed sensor 276. The speed signal on input line 272 varies in accordance with the vehicle speed.

Timer 266 receives the speed signal from controller 248 and the activation signal from receiver 264. Timer 266 activates approach light 22 in accordance with the activation signal and speed signal. For example, if timer 266 receives an activation signal and the speed signal indicates that the vehicle moves at less than a predetermined speed, timer 266 supplies electrical power to approach light 22 for a predetermined time period. Such time period may be as described above with respect to FIG. 26. If timer 266 detects that the speed signal on input line 272 indicates a vehicle speed above the predetermined threshold, timer 266 supplies power to approach light 22 for a predetermined time period much shorter than the predetermined time period when the vehicle is less than the threshold. For example, for a vehicle speed less than 10 miles per hour (MPH), timer 266 may activate approach light 22 for, by way of example, 30 seconds. When timer 266 detects an activation signal and determines that the vehicle speed exceeds, for example, 30 MPH, timer 266 may activate approach light 22 for, by way of example, 1 or 2 seconds. FIG. 27 thus discloses a control circuit 270 having a variable timeout function for controlling approach light 22. The variable timeout function provides safer operation of approach light 22 by limiting the activation period for approach light 22 when the vehicle speed exceeds a predetermined threshold.

Figure 28:
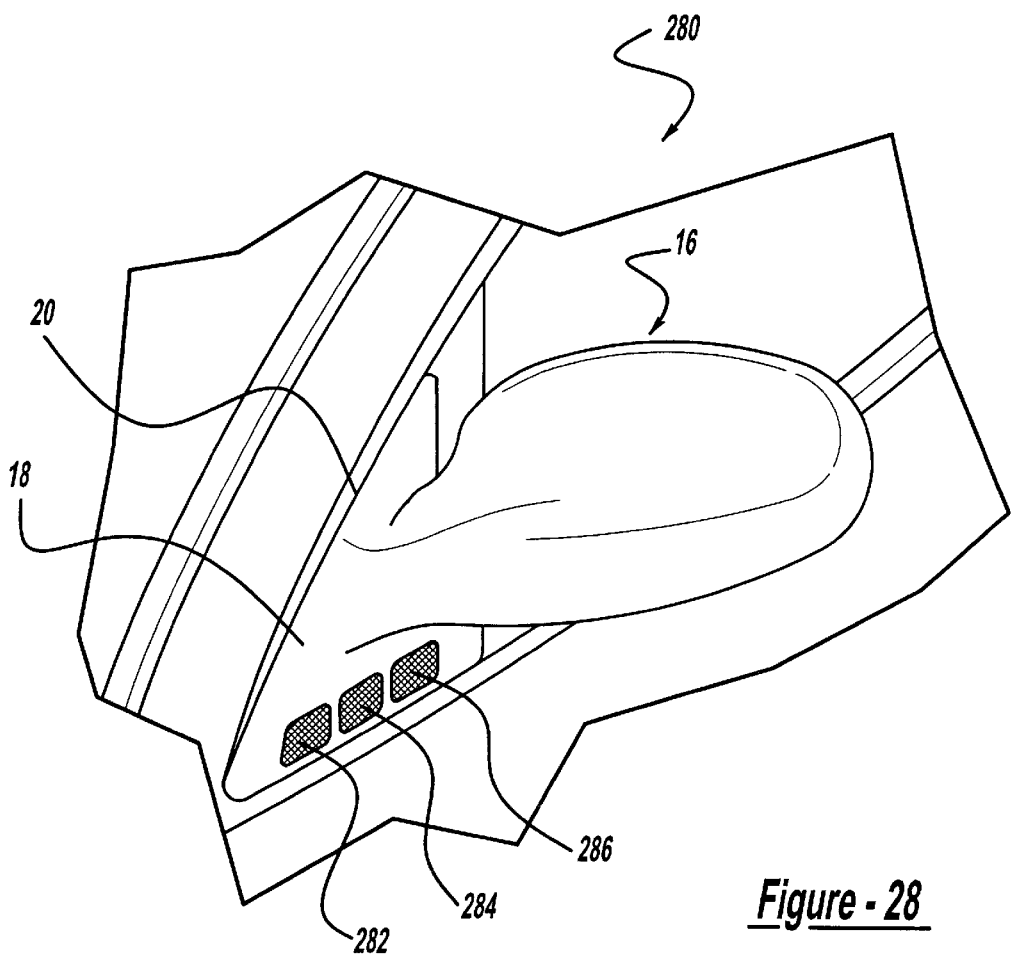
FIG. 28 is a front perspective view of a mirror assembly having a plurality of lights mounted in the attachment member.

FIG. 28 depicts yet another embodiment of a mirror assembly 280. Mirror assembly 280 of FIG. 28 includes a plurality of lights mounted in vehicle attachment member 16. Mirror assembly 280 is configured similarly to mirror assembly 10 if FIGS. 1–3. Mirror assembly 280 includes a housing 12 for supporting and housing a reflective element 14. Housing 12 attaches to vehicle 40 via a vehicle attachment member 16. Vehicle attachment member includes sail portion 18 and support arm portion 20, all of which have been described herein. Of particular interest, FIG. 28 includes a plurality of lights mounted in vehicle attachment member 16. In this embodiment the lights are mounted in sail portion 18. The plurality of lights comprises three lights.

A turning light 282 provides illumination while turning. Turning light 282 preferably operates in conjunction with the vehicle turn indicators to illuminate the direction in which the vehicle operator intends to turn or the direction in which the operator desires to change lanes. Turning light 282 preferably provides either white or amber illumination in accordance with various designs and safety regulation considerations.

A center light 284 provides single or dual purpose lighting and is disposed rearward of turning light 282. Center light 282 preferably includes a low trajectory light activated by a remote security system. Activation of a security system, such as through an IR transmitter or other electromagnetic transmitter as in a key FOB, activates low trajectory lamp of center light 284. Low trajectory light preferably illuminates areas beneath mirror assembly 280 and adjacent vehicle 40. Center light 284 also preferably includes a high trajectory light which illuminates a zone perpendicular to vehicle 40. Preferably, the vehicle operator activates the high trajectory beam from within or remotely from the vehicle. The high trajectory beam preferably illuminates a zone which facilitates reading mail boxes, street addresses, and street signs.

A rear light 286 is disposed rearward of center light 284. Rear light 286 preferably illuminates a zone generally rearward of mirror assembly 10. Rear light 286 preferably is activated directly by the driver or by the vehicle security system in response to an individual approaching the side window. Rear light 286 thus preferably, primarily illuminates a zone coincident with and slightly above the front and rear side windows to provide maximum illumination of the face of an individual approaching the vehicle.

The embodiments of the mirror assembly described herein provide several beneficial features. Removing the light from the housing frees up additional space in the housing so that additional support structures and components can be included in the housing. The above-described invention provides substantial flexibility in determining the desired placement of the approach light and its light source within the attachment member. Relocating the light source from the housing further inboard to the attachment member reduces the mass in the mirror housing, thereby improving the performance of the mirror by reducing vibration of the reflective element. Further, placing the approach light further inboard in the attachment reduces the length of the wiring harness for powering the approach light, thereby further reducing weight and cost of the vehicle. The above-described positions of the approach light, whether support arm portion-mounted or sail portion-mounted also provide improved serviceability. Further yet, locating the approach light in the attachment member enables the approach light to maintain the light pattern regardless of the position of the mirror housing, whether folded inboard or unfolded outboard. This feature becomes particularly relevant when maneuvering in close quarters when illuminating the side areas of the vehicle is important and the housing may be folded inboard. Further yet, placement of the lens in the attachment member reduces the airflow over the lens, thereby providing a cleaner lens during operation. The above-described invention also provides a better seal for the approach light, thereby limiting dirt, debris, water, and road salt which could inhibit performance of the approach light. Further, by providing reflectors for better directing illumination from the approach light either forward or rearward, additional portions of the vehicle may be illuminated in order to facilitate, for example, changing tires at night on the side of the road. The above-described approach light also provides additional features of facilitating vehicle identification in a parking lot and also optionally provides an alarm beacon indicating to the approaching operator that security of the vehicle may have been comprised.

While specific embodiments have been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed is:

1. An exterior rear view mirror assembly comprising:
    a housing;
    a reflective mirror supported by the housing and arranged in a rearwardly facing direction;
    a support member having an outboard end attached to the housing and an inboard end secured to an outer surface of a motor vehicle, the support member including an opening;
    a light transmitting lens disposed in the opening of the support member, the lens enabling light to project from an interior of the support member to illuminate a predetermined area in proximity to the motor vehicle; and
    a light source secured within the support member, the light source being operable to generate a light for projection through the lens, the light source being selectively operable to adjust the projected light in a plurality of directions.

2. The apparatus of claim 1 further comprising:
    a light path traversing between the lens and the light source, the light path transporting light between the light source and the lens.

3. The apparatus of claim 2 wherein the light path includes a reflective element for reflecting light from the light source in the direction of the lens.

4. The apparatus of claim 2 further comprising:
    a sail formed integrally with the support member, the sail securing the support member to the motor vehicle; and
    an environmental seal formed between the motor vehicle and the sail,
    wherein the light assembly housing is located inboard of the seal.

5. The apparatus of claim 1 further comprising a sail formed integrally with the support member for securing the support member to the motor vehicle, wherein the opening includes a portion of the support member and the sail and wherein the lens forms a smooth contour in the opening between the support member and the sail.

6. The apparatus of claim 1 further comprising a sail formed integrally with the support member for securing the support member to the motor vehicle, wherein the opening of the support member is formed in the sail, and the light transmitting lens is disposed in the opening of the support member.

7. The apparatus of claim 1 further comprising:
    a light path integrally formed in the support member and traversing between the lens and the light source, the light path transporting light between the light source and the lens.

8. The apparatus of claim 1 further comprising a cover formed to cover the opening to replace the light transmitting lens.

9. An exterior rear view mirror assembly comprising:
    a housing;
    a reflective mirror supported by the housing and arranged in a rearwardly facing direction;
    a support member having an outboard end attached to the housing and an inboard end secured to an outer surface of a motor vehicle, the support member including an opening;

a sail attached to the inboard end of the support member, the sail securing the support member to the motor vehicle;

a light transmitting lens disposed in the opening of the support member, the lens enabling light to project from an interior of the support member to illuminate a predetermined area in proximity to the motor vehicle; and a light source secured within the support member, the light source being operable to generate a light for projection through the lens, the light source being selectively operable to adjust the projected light in a plurality of directions.

10. The apparatus of claim 9 further comprising:

a light path traversing between the lens and the light source, the light path transporting light between the light source and the lens.

11. The apparatus of claim 10 wherein the light path includes a reflective element for reflecting light from the light source in the direction of the lens.

12. The apparatus of claim 9 further comprising an environmental seal formed between the motor vehicle and the sail, wherein the light source is located inboard of the seal.

13. The apparatus of claim 9 wherein the lens forms a smooth contour in the opening between the support member and the sail.

14. The apparatus of claim 9 wherein the opening of the support member is formed in the sail, and the light transmitting lens is disposed in the opening of the support member.

15. The apparatus of claim 9 further comprising:

a light path integrally formed in the support member and traversing between the lens and the light source, the light path transporting light between the light source and the lens.

16. The apparatus of claim 9 further comprising a cover formed to cover the opening to replace the light transmitting lens.

17. An exterior rear view mirror assembly comprising:

a housing;

a reflective mirror supported by the housing and arranged in a rearwardly facing direction;

a support member having an outboard end attached to the housing and an inboard end secured to an outer surface of a motor vehicle, the support member including an opening;

a light transmitting lens disposed in the opening of the support member, the lens enabling light to project from an interior of the support member to illuminate a predetermined area in proximity to the motor vehicle;

a reflective element disposed in proximity to the light transmitting lens and exterior to the support member, the reflective element reflecting light projected from the light transmitting lens; and a light source secured within the support member, the light source being operable to generate a light for projection through the lens.

18. The apparatus of claim 17 further comprising an aperture formed in the support member, the aperture receiving the reflective element, wherein the reflective element may be removably connected to the support member to selectively reflect light projected from the lens.

19. The apparatus of claim 17 further comprising:

a plurality of apertures formed in the support member; and a plurality of reflective elements disposed in proximity to the light transmitting lens and exterior to the support member, the reflective element reflecting light projected from the light transmitting lens, wherein selected ones of the reflective elements may be removably connected to selected ones of the apertures in order to reflect light in various, predetermined directions.

20. The apparatus of claim 17 further comprising an aperture formed in the support member, the aperture receiving the reflective element, wherein the reflective element may be displaced within the aperture to vary a size of a reflective surface reflecting light projected from the lens.

21. The apparatus of claim 17 further comprising:

a plurality of apertures formed in the support member; and a plurality of reflective elements disposed within the plurality of apertures and be displaceable within the aperture to vary exposure of a reflective surface reflecting light projected from the lens, wherein selected ones of the reflective elements may be variably exposed in order to reflect light in various, predetermined directions.

22. The apparatus of claim 17 wherein the reflector is disposed to reflect light at least one of rearwardly, forwardly, downwardly and outboard with respect to the vehicle.

23. The apparatus of claim 17 further comprising:

a light path traversing between the lens and the light source, the light path transporting light between the light source and the lens.

24. The apparatus of claim 17 further comprising:

a sail formed integrally with the support member, the sail securing the support member to the motor vehicle;

an environmental seal formed between the motor vehicle and the sail, wherein the light source is located inboard of the seal.

25. The apparatus of claim 17 further comprising a sail formed integrally with the support member for securing the support member to the motor vehicle, wherein the opening includes a portion of the support member and the sail and wherein the lens forms a smooth contour in the opening between the support member and the sail.

26. The apparatus of claim 17 further comprising a sail formed integrally with the support member for securing the support member to the motor vehicle, wherein the opening of the support member is formed in the sail, and the light transmitting lens is disposed in the opening of the support member.

27. The apparatus of claim 17 further comprising:

a light path integrally formed in the support member and traversing between the lens and the light source, the light path transporting light between the light source and the lens.

28. An exterior rear view mirror assembly comprising:

a housing;

a reflective mirror supported by the housing and arranged in a rearwardly facing direction;

a support member having an outboard end attached to the housing and an inboard end secured to an outer surface of a motor vehicle, the support member including an opening;

a light source secured within the support member, the light source being operable to generate a light for projection through the lens, the light source being selectively adjustable to project light through the support in a plurality of directions; and an adjustment member attached at one end to the light source and having an other end disposed interior to the motor vehicle, the adjustment member enabling an occupant within the vehicle to selectively displace the light source.

29. An exterior rear view mirror assembly comprising:

a housing;

a reflective mirror supported by the housing and arranged in a rearwardly facing direction;

a support member having an outboard end attached to the housing and an inboard end secured to an outer surface of a motor vehicle, the support member including an opening;

a light transmitting lens disposed in the opening of the support member, the lens enabling light to project from an interior of the support member to illuminate a predetermined area in proximity to the motor vehicle; and a light source secured within the support member, the light source being operable to generate a light for projection through the lens, the light source being selectively adjustable to project light through the support in a plurality of directions;

a switch for selectively activating the light source;

a speed sensor, the speed sensor generating a vehicle speed signal that varies in accordance with the speed of the vehicle; and a timer, the timer receiving the speed signal and receiving an activation signal, wherein the timer actuates the light source in accordance with the activation signal and the speed signal.

30. The system of claim 29 wherein if the timer receives an activation signal and the speed signal indicates a speed less than a predetermined threshold, the timer actuates the light signal for a first predetermined time period.

31. The system of claim 30 wherein if the timer receives an activation signal and the speed signal indicates a speed greater than a predetermined threshold, the timer actuates the light signal for a second predetermined time period less than the first.

32. The system of claim 29 wherein the activation signal is generated remotely.

33. The system of claim 29 further comprising:

a transmitter for generating an electromagnetic signal; and a receiver, the receiver receiving the electromagnetic signal and generating an activation signal to the timer.

34. The system of claim 33 wherein the transmitter is a key FOB for a vehicle.

35. An exterior rear view mirror assembly comprising:

a housing;

a reflective mirror supported by the housing and arranged in a rearwardly facing direction;

a support member having an outboard end attached to the housing and an inboard end secured to an outer surface of a motor vehicle, the support member including an opening;

a light transmitting lens disposed in the opening of the support member, the lens enabling light to project from an interior of the support member to illuminate a predetermined area in proximity to the motor vehicle; and a light source secured within the support member, the light source being operable to generate a light for projection through the lens, the light source being selectively adjustable to project light through the support in a plurality of directions;

a switch for selectively activating the light source; and a control circuit, the control circuit receiving an input and generating an output in accordance with the input, wherein the output controls activation of the switch, wherein the control circuit receives input from at least two of a door lock sensor, an interior light sensor, a hazard light sensor, a reverse light sensor, a folded mirror sensor, a hood sensor, an approach light switch, a gear selector, a timer, a proximity sensor, and an alarm sensor.

36. Am exterior rear view mirror assembly comprising:

a housing;

a reflective mirror supported by the housing and arranged in a rearwardly facing direction;

a support member having an outboard end attached to the housing and an inboard end secured to an outer surface of a motor vehicle, the support member including an opening;

a light transmitting lens disposed in the opening of the support member, the lens enabling light to project from an interior of the support member to illuminate a predetermined area in proximity to the motor vehicle;

a light source secured within the support member, the light source being operable to generate a light for projection through the lens; and a cover formed to cover the opening to replace the light transmitting lens.

37. An exterior rear view mirror assembly comprising:

a housing;

a reflective mirror supported by the housing and arranged in a rearwardly facing direction;

a support member having an outboard end attached to the housing and an inboard end secured to an outer surface of a motor vehicle, the support member including an opening;

a sail attached to the inboard end of the support member, the sail securing the support member to the motor vehicle;

a light transmitting lens disposed in the opening of the support member, the lens enabling light to project from an interior of the support member to illuminate a predetermined area in proximity to the motor vehicle;

a light source secured within the support member, the light source being operable to generate a light for projection through the lens; and a cover formed to cover the opening to replace the light transmitting lens.

38. An exterior rear view mirror assembly comprising:

a housing;

a reflective mirror supported by the housing and arranged in a rearwardly facing direction;

a sail member having an outboard end attached to the housing and an inboard end secured to an outer surface of a motor vehicle, the sail member including an opening;

a light transmitting lens disposed in the opening of the sail member, the lens enabling light to project from an interior of the sail member to illuminate a predetermined area in proximity to the motor vehicle; and a light source secured within the sail member, the light source being operable to generate a light for projection through the lens.

39. An exterior rear view mirror assembly comprising:

a housing;

a reflective mirror supported by the housing and arranged in a rearwardly facing direction;

a sail member having an outboard end attached to the housing and an inboard end secured to an outer surface of a motor vehicle, the sail member including an opening;

a light transmitting lens disposed in the opening of the sail member, the lens enabling light to project from an interior of the sail member to illuminate a predetermined area in proximity to the motor vehicle;

a reflective element disposed in proximity to the light transmitting lens and exterior to the sail member, the reflective element reflecting light projected from the light transmitting lens; and a light source secured within the sail member, the light source being operable to generate a light for projection through the lens.

40. An exterior rear view mirror assembly comprising:

a housing;

a reflective mirror supported by the housing and arranged in a rearwardly facing direction;

a sail member having an outboard end attached to the housing and an inboard end secured to an outer surface of a motor vehicle, the sail member including an opening;

a light source secured within the sail member, the light source being operable to generate a light for projection through the lens, the light source being adjustable to project light through the support in a plurality of directions; and an adjustment member attached at one end to the light source and having an other end disposed interior to the motor vehicle, the adjustment member enabling an occupant within the vehicle to displace the light source.

41. An exterior rear view mirror assembly comprising:

a housing;

a reflective mirror supported by the housing and arranged in a rearwardly facing direction;

a sail member having an outboard end attached to the housing and an inboard end secured to an outer surface of a motor vehicle, the sail member including an opening;

a light transmitting lens disposed in the opening of the sail member, the lens enabling light to project from an interior of the sail member to illuminate a predetermined area in proximity to the motor vehicle; and a light source secured within the sail member, the light source being operable to generate a light for projection through the lens, the light source being adjustable to project light through the support in a plurality of directions;

a switch for selectively activating the light source;

a speed sensor, the speed sensor generating a vehicle speed signal that varies in accordance with the speed of the vehicle; and a timer, the timer receiving the speed signal and receiving an activation signal, wherein the timer actuates the light source in accordance with the activation signal and the speed signal.

42. An exterior rear view mirror assembly comprising:

a housing;

a reflective mirror supported by the housing and arranged in a rearwardly facing direction;

a sail member having an outboard end attached to the housing and an inboard end secured to an outer surface of a motor vehicle, the sail member including an opening;

a light transmitting lens disposed in the opening of the sail member, the lens enabling light to project from an interior of the sail member to illuminate a predetermined area in proximity to the motor vehicle; and a light source secured within the sail member, the light source being operable to generate a light for projection through the lens, the light source being adjustable to project light through the support in a plurality of directions;

a switch for selectively activating the light source; and a control circuit, the control circuit receiving an input and generating an output in accordance with the input, wherein the output controls activation of the switch, wherein the control circuit receives input from at least two of a door lock sensor, an interior light sensor, a hazard light sensor, a reverse light sensor, a folded mirror sensor, a hood sensor, an approach light switch, a gear selector, a timer, a proximity sensor, and an alarm sensor.

* * * * *

UNITED STATES PATENT AND TRADEMARK OFFICE
CERTIFICATE OF CORRECTION

| | | |
|---|---|---|
| PATENT NO. | : 6,572,250 B1 | Page 1 of 1 |
| APPLICATION NO. | : 09/525550 | |
| DATED | : June 3, 2003 | |
| INVENTOR(S) | : Andrew J. Assinder et al. | |

It is certified that error appears in the above-identified patent and that said Letters Patent is hereby corrected as shown below:

Column 12,
Line 51, "if" should be --in--.

Column 18,
Line 14, Claim 36, "Am" should be --An--.

Signed and Sealed this

Tenth Day of October, 2006

JON W. DUDAS
*Director of the United States Patent and Trademark Office*